United States Patent
Liu

(10) Patent No.: US 6,338,062 B1
(45) Date of Patent: Jan. 8, 2002

(54) RETRIEVAL SYSTEM, RETRIEVAL METHOD AND COMPUTER READABLE RECORDING MEDIUM THAT RECORDS RETRIEVAL PROGRAM

(75) Inventor: Shaoming Liu, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/387,850

(22) Filed: Sep. 1, 1999

(30) Foreign Application Priority Data

Sep. 28, 1998 (JP) ............................ 10-272911

(51) Int. Cl.$^7$ .............................................. G06F 17/30
(52) U.S. Cl. ........................ 707/6; 707/3; 707/4; 707/5
(58) Field of Search ................................. 707/3, 4, 5, 6

(56) References Cited

U.S. PATENT DOCUMENTS

| | | | | |
|---|---|---|---|---|
| 4,775,956 A | * | 10/1988 | Kaji et al. ................... 364/900 |
| 5,371,674 A | * | 12/1994 | Obuchi .................. 364/419.05 |
| 5,465,308 A | * | 11/1995 | Hutcheson et al. ......... 382/159 |
| 5,754,676 A | * | 5/1998 | Komiya et al. ............. 382/132 |
| 5,754,686 A | * | 5/1998 | Harada et al. .............. 382/187 |
| 5,796,926 A | * | 8/1998 | Huffman ...................... 395/77 |
| 5,799,115 A | * | 8/1998 | Asano et al. ............... 382/305 |
| 5,825,926 A | * | 10/1998 | Tanaka ........................ 382/229 |
| 6,075,896 A | * | 6/2000 | Tanaka ........................ 382/229 |
| 6,085,190 A | * | 7/2000 | Sakata ............................ 707/6 |
| 6,189,002 B1 | * | 2/2001 | Roiblat .......................... 707/1 |

FOREIGN PATENT DOCUMENTS

| JP | 6-251156 | 9/1994 |
|---|---|---|
| JP | 7-28844 | 1/1995 |

* cited by examiner

Primary Examiner—Frantz Coby
(74) Attorney, Agent, or Firm—Oliff & Berridge, PLC

(57) ABSTRACT

The object of the present invention is to enable high-speed and high-precision pattern retrieval. Therefore, a retrieval dictionary generation unit classifies learned patterns into plural clusters, and generates a retrieval dictionary using the clusters. A nearest cluster detector detects the nearest cluster to an input retrieval pattern among clusters stored in the retrieval dictionary. A learned pattern detector compares each learned pattern which belongs to the nearest cluster with the retrieval pattern and detects a learned pattern at predetermined distance from the retrieval pattern. A retrieval range decision unit decides a retrieval range using the learned pattern detected by the learned pattern detector and retrieval information. A retrieval unit executes the retrieval of the retrieval pattern from among all the learned patterns in the retrieval range.

20 Claims, 17 Drawing Sheets

RETRIEVAL SYSTEM, RETRIEVAL METHOD AND COMPUTER READABLE RECORDING MEDIUM THAT RECORDS RETRIEVAL PROGRAM

BACKGROUND OF THE INVENTION

1. Field of the Invention

The present invention relates to a retrieval system, a retrieval method and a computer readable recording medium that records a retrieval program, particularly relates to a retrieval system that executes pattern retrieval, a retrieval method of executing pattern retrieval and a computer readable recording medium that records a retrieval program that instructs a computer to execute pattern retrieval.

2. Description of the Related Art

Technology for pattern retrieval and structure retrieval means technology for retrieving the pattern of a character, voice and an image, compound molecular structure, RNA secondary structure and others using a computer, and a demand for higher-speed and higher-precision retrieval is arising as diversified and complicated computerized society has developed in recent years.

The retrieval of the most similar pattern or structure may be demanded in addition to the retrieval of a pattern or structure completely coincident.

For example, in the field of information chemistry, the issue of structure and activity that the property may be similar if the structure of compounds is similar has been researched from long ago and in such a case, there is a strong demand for efficiently classifying millions of compound molecular structures and efficiently retrieving similar structure.

In the field of pattern retrieval, a round robin retrieval method is known that distance or similarity between patterns is defined using their features, and a retrieval pattern is estimated by comparing an input unknown pattern (hereinafter called a retrieval pattern) with all retrieved patterns (hereinafter called a learned pattern) using the above distance or similarity.

However, in the above round robin retrieval method, as it requires much labor to calculate distance or similarity between patterns, there is a serious defect that it requires considerable time to compare with a large number of learned patterns.

Therefore, heretofore, a rough classification retrieval method that distance between learned patterns is calculated beforehand, learned patterns are classified into some clusters and retrieval is made has been widely used.

For example, in Japanese Published Unexamined Patent Application No. Hei 6-251156, the nearest cluster is acquired by classifying learned patterns into some clusters using distance between the patterns and comparing a retrieval pattern with the representative of each cluster, while converting the feature of the retrieval pattern.

A retrieval pattern is estimated by comparing all the learned patterns that belong to the acquired cluster with the retrieval pattern.

In the meantime, in the field of information chemistry, if the similar molecular structure or the partially similar molecular structure to designed molecular structure is retrieved when a new compound is synthesized, it comes into question how distance or similarity between compound molecular structures should be defined, how compound molecular structure should be represented, how a compound should be classified and how similar structure should be retrieved.

In Japanese Published Unexamined Patent Application No. Hei 7-28844, distance between structures is calculated by representing the solid structure of a substance by a point set and overlapping two solid structures. A similar structure is retrieved by narrowing down proposed structures depending upon geometric relationship and reducing a retrieved range.

However, in the above conventional type rough classification retrieval method, there is a problem that retrieval precision is bad though retrieval speed is fast.

FIGS. 18A and 18B show the problem of the rough classification retrieval method in relation to precision. FIG. 18A shows a case that clusters are overlapped and FIG. 18B shows a case that clusters are not overlapped.

Suppose that in retrieval shown in FIG. 18A, a cluster A is first acquired as a cluster distance between an input pattern q and the representative of which is the minimum (that is, D1<D2 as shown in FIG. 18A).

Distance between each of plural learned patterns in the cluster A and the input pattern q is compared. Then, a learned pattern a located at the minimum distance d1 is acquired as a similar pattern.

However, while distance between the input pattern q and the cluster representative is larger in a cluster B than in a cluster A, distance d2, which is the distance from a learned pattern b, is smaller than distance d1. That is, the learned pattern b is actually a pattern the most similar to the input pattern q.

Also similarly in the case of FIG. 18B, distance D1 between a retrieval pattern q and the representative of the cluster A is smaller than distance D2 between the retrieval pattern q and the representative of the cluster B, however, a pattern most similar to the retrieval pattern q is not the learned pattern a but is actually the learned pattern b in the cluster B (d2<d1).

Therefore, there is a problem that retrieval precision in the rough classification retrieval method strongly depends upon the definition and a calculation method of distance between learned patterns, a method of representing a learned pattern itself and a method of classifying learned patterns into any cluster, and the secure retrieval of the most similar pattern is not guaranteed.

Also, in the above related art, the enhancement of precision is tried by converting the feature of an input pattern and utilizing the characteristics of the solid structure of a substance, however, in any case, as retrieval precision depends upon the distance, a representation method and a classification method of a pattern, it cannot be said that the reliability of retrieval precision is sufficiently high.

SUMMARY OF THE INVENTION

The present invention is made in view of these points and the object is to provide a retrieval system that executes high-speed and high-precision retrieval without depending upon the distance, a representation method and a classification method of a pattern.

Another object of the present invention is to provide a retrieval method for enabling high-speed and high-precision retrieval without depending upon the distance, a representation method and a classification method of a pattern.

Further, another object of the present invention is to provide a computer readable recording medium that records a retrieval program for executing high-speed and high-precision retrieval without depending upon the distance, a representation method and a classification method of a pattern.

According to the present invention, in order to solve the above problems, a retrieval system is provided that executes pattern retrieval and is characterized by comprising a retrieval dictionary generation unit that classifies learned patterns into plural clusters, and generates a retrieval dictionary using the clusters, a nearest cluster detector that detects the nearest cluster to an input retrieval pattern among the above clusters stored in the above retrieval dictionary, a learned pattern detector that detects a learned pattern located at a predetermined distance from the above retrieval pattern by comparing all the learned patterns that belong to the nearest cluster with the above retrieval pattern, a retrieval range decision unit that decides a retrieval range using the above learned pattern detected by the learned pattern detector and the retrieval dictionary and a retrieval unit that retrieves the above retrieval pattern from among all the learned patterns that belong to the above retrieval range.

The above retrieval dictionary generation unit classifies learned patterns into plural clusters, and generates a retrieval dictionary using the clusters. The above nearest cluster detector detects the nearest cluster to an input retrieval pattern among the clusters stored in the retrieval dictionary. The learned pattern detector detects a learned pattern located at predetermined distance from the retrieval pattern by comparing all the learned patterns that belong to the nearest cluster with the retrieval pattern. The above retrieval range decision unit decides a retrieval range using the learned pattern detected by the learned pattern detector and retrieval information. The retrieval unit retrieves the retrieval pattern from among all the learned patterns in the retrieval range.

BRIEF DESCRIPTION OF THE DRAWINGS

FIG. 18A shows a case that clusters are overlapped and FIG. 18B shows a case that clusters are not overlapped.

DESCRIPTION OF THE PREFERRED EMBODIMENT

Figure 1:
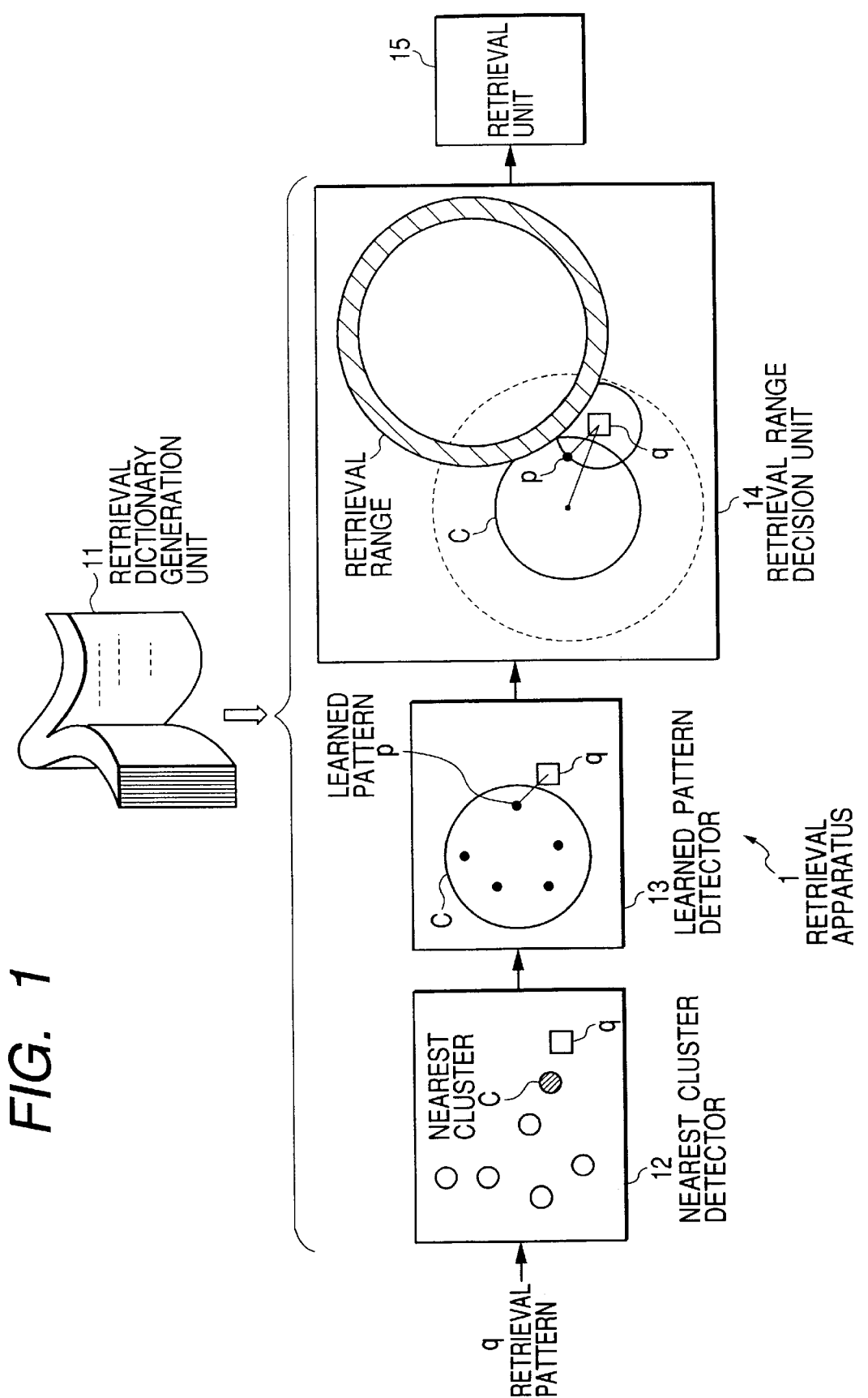
FIG. 1 shows the principle of a retrieval system according to the present invention.

Referring to the drawings, an embodiment of the present invention will be described below. FIG. 1 shows the principle of a retrieval system according to the present invention. The retrieval system 1 executes pattern (including structure) retrieval and similar pattern retrieval.

The retrieval dictionary generation unit 11 classifies learned patterns into plural clusters based upon information such as distance as a scale for showing difference in structure or a property between patterns or similarity as a scale showing how patterns are similar and others, and generates a retrieval dictionary using the above clusters. The details of the retrieval dictionary will be described later.

The nearest cluster detector 12 detects the nearest cluster C that is nearest to an input retrieval pattern q from among the clusters stored in the retrieval dictionary.

The learned pattern detector 13 detects a learned pattern p located at predetermined distance (hereinafter called the minimum distance) from the retrieval pattern q by comparing all the learned patterns that belong to the nearest cluster C with the retrieval pattern q.

The retrieval range decision unit 14 decides a retrieval range using the learned pattern p detected by the learned pattern detector 13 and the retrieval dictionary.

That is, the retrieval range decision unit decides a retrieval range (a part having oblique lines in FIG. 1) using the distance between the learned pattern p and the retrieval pattern q, the distances between clusters and the radiuses of clusters stored in the retrieval dictionary. The details will be described later.

The retrieval unit 15 executes the pattern retrieval and the similar pattern retrieval of the retrieval pattern q from among all the learned patterns that belong to the retrieval range.

Figure 2:
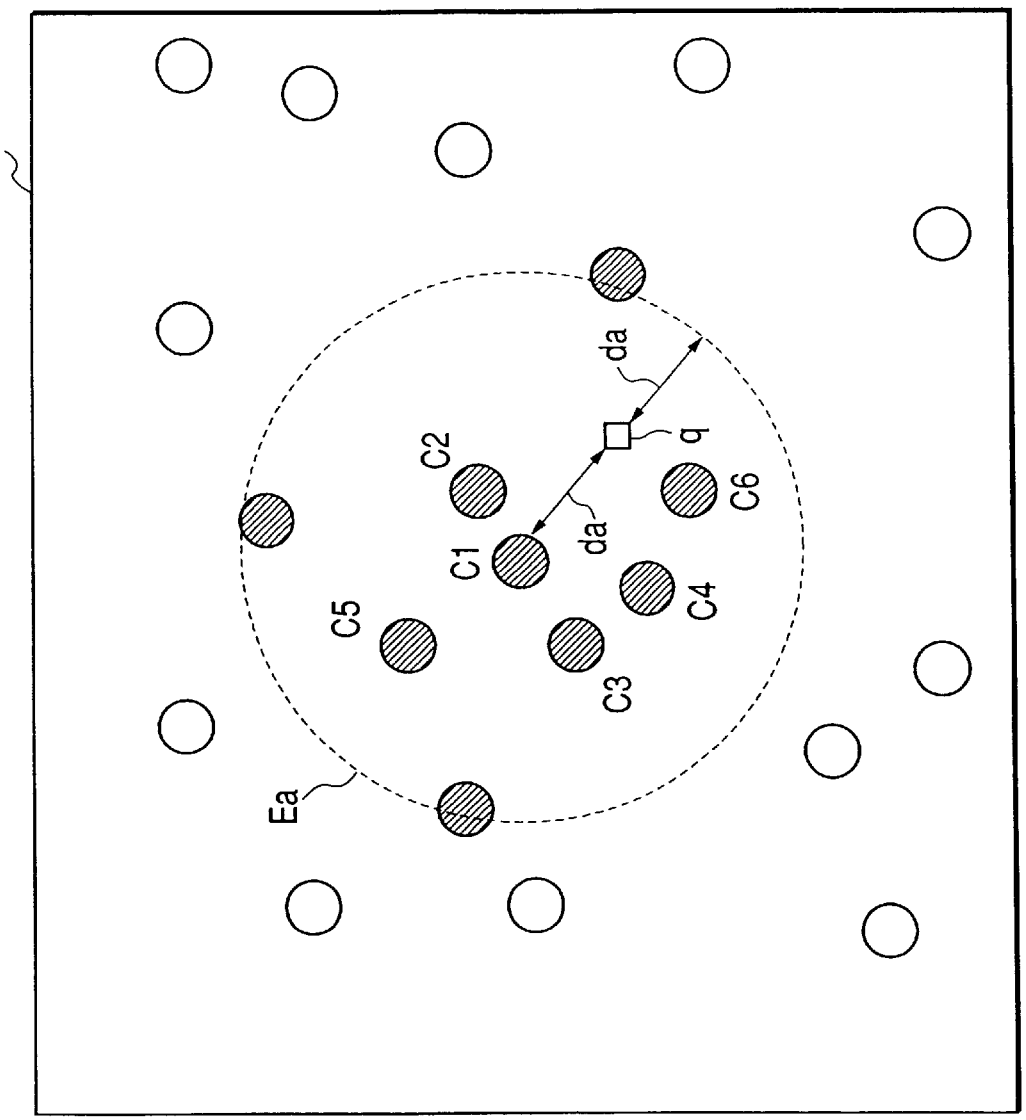
FIG. 2 explains the operation of a nearest cluster detector.
Figure 3:
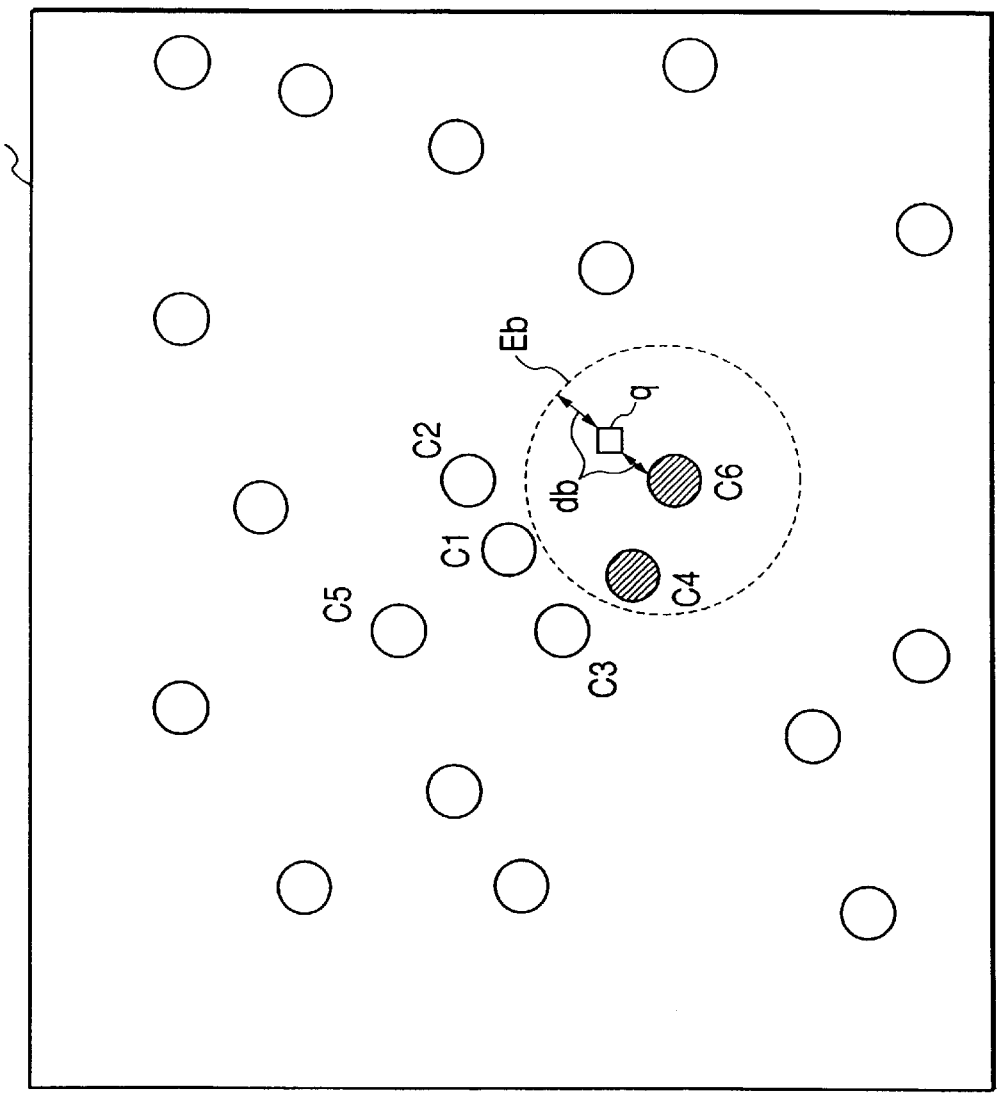
FIG. 3 explains the operation of the nearest cluster detector.
Figure 4:
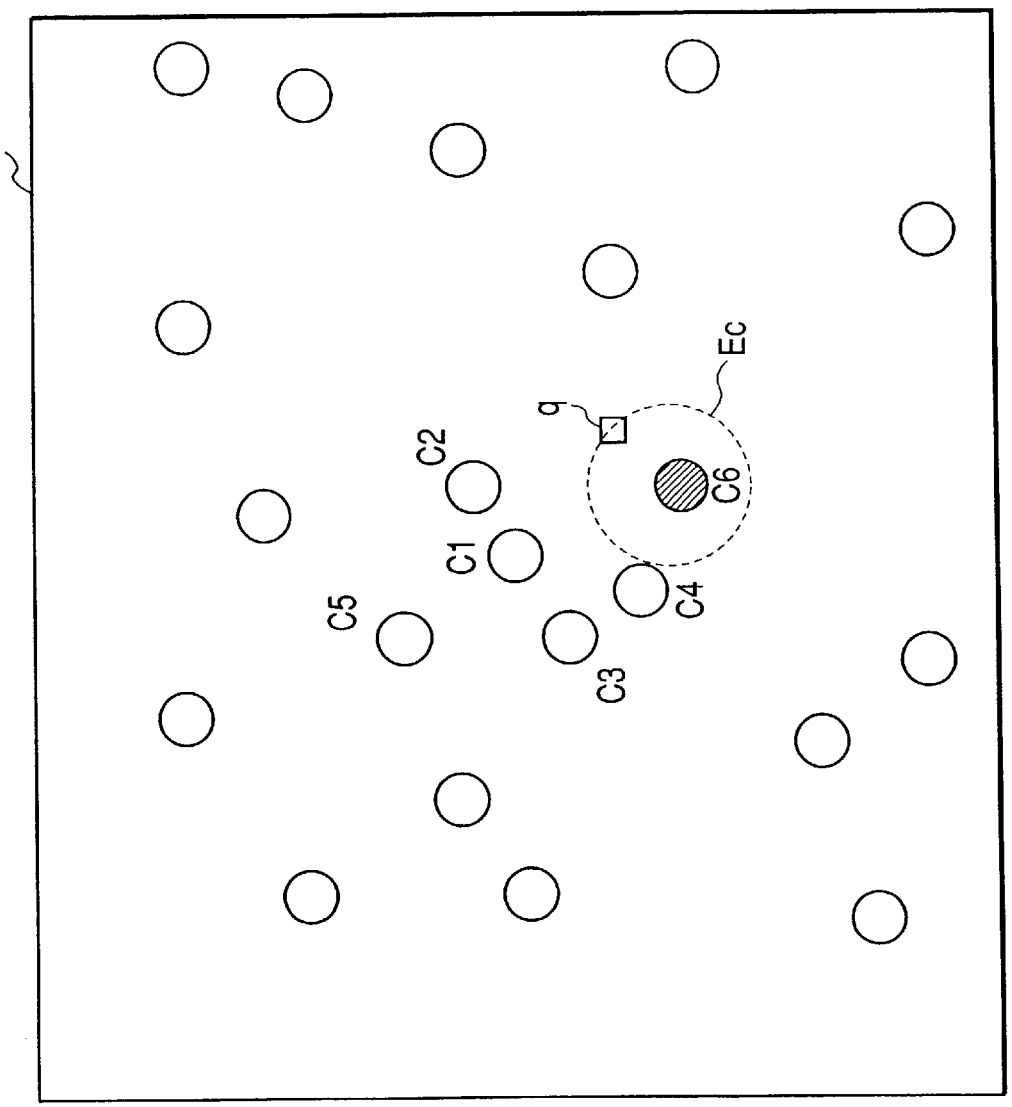
FIG. 4 explains the operation of the nearest cluster detector.

Next, the outline of the operation of the retrieval system 1 will be described. FIGS. 2 to 4 explain the operation of the nearest cluster detector 12.

Plural clusters and the retrieval pattern q are shown in multidimensional space in FIG. 2. First, the distance da between a cluster C1 located in the center of the multidimensional space and the retrieval pattern q is obtained. A circle Ea having distance 2da equivalent to the double of the distance da as a radius is obtained as a first cluster comparison range and the nearest cluster is searched out of plural clusters in the circle Ea.

After the circle Ea is obtained, distance between the retrieval pattern q and each cluster in the circle Ea is obtained based upon cluster comparison order stored in the retrieval dictionary (cluster comparison order in comparing with the retrieval pattern q is that each cluster is compared in order in which distance from the cluster C1 is smaller. C2 to C6 are allocated in order in which distance from the cluster C1 is smaller in FIG. 2) and if the above distance is smaller than distance obtained last time, the cluster comparison range is reduced.

For example, if distance between the cluster C2 and the retrieval pattern q is obtained and the distance is smaller than the distance between the cluster C1 and the retrieval pattern q, the circle which is a cluster comparison range is reduced, distance between the retrieval pattern and each cluster in the range based upon comparison order is further obtained and the cluster comparison range is sequentially reduced.

FIG. 3 shows a halfway step in which the cluster comparison range is reduced. Distance db between a cluster C6 and the retrieval pattern q is obtained. A circle Eb having distance 2db as a radius functions as a cluster comparison range and the nearest cluster is searched from among the clusters in the circle Eb.

FIG. 4 shows that the nearest cluster is obtained. As shown in FIG. 4, the cluster comparison range is reduced and the cluster C6 in a circle Ec is finally detected as the nearest cluster.

The nearest cluster to the retrieval pattern q can be efficiently detected at high speed by gradually reducing the cluster comparison range as described above.

Figure 5:
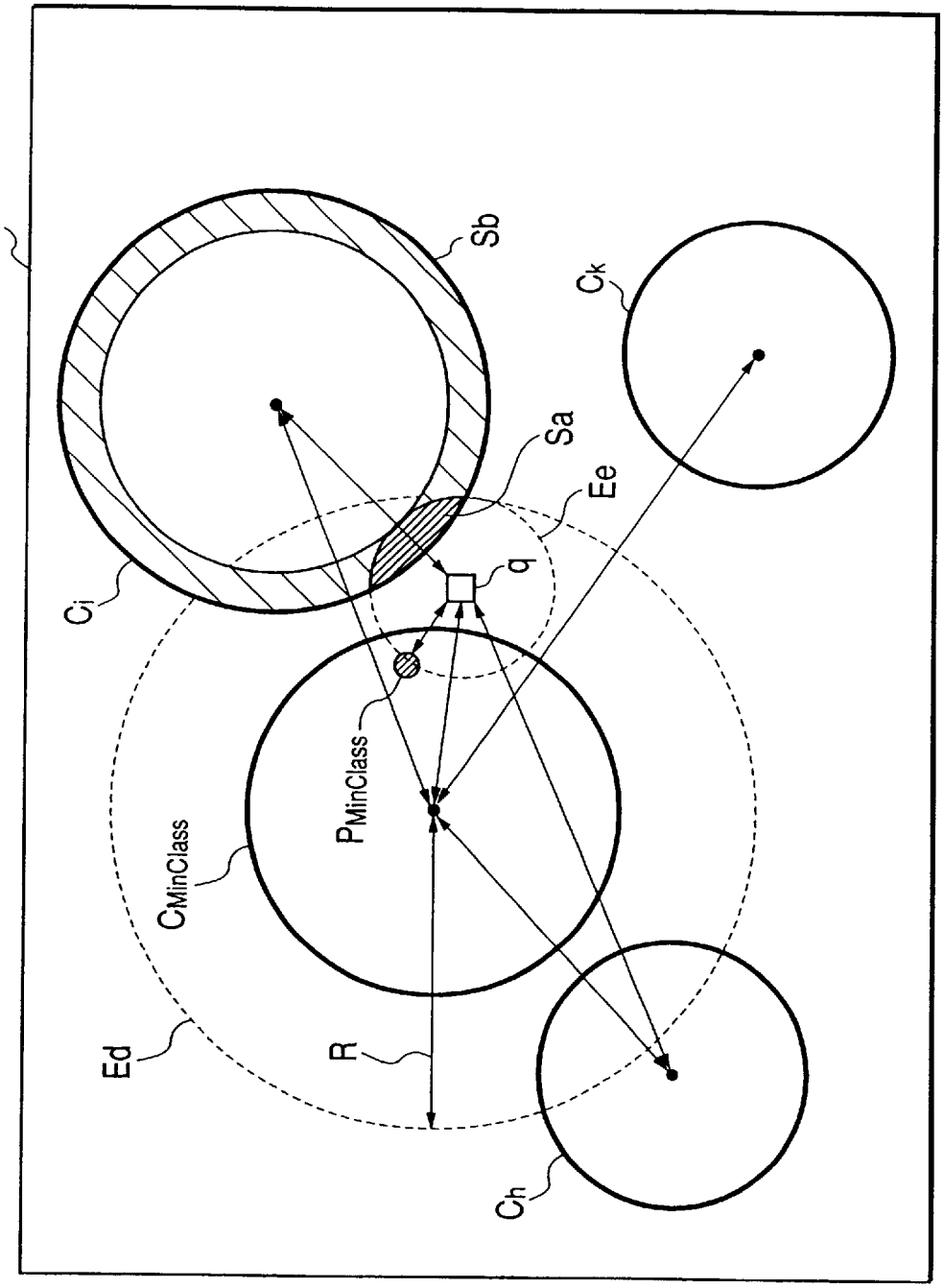
FIG. 5 explains the operation of a learned pattern detector and a retrieval range decision unit.

Next, the operation of the learned pattern detector 13 and the retrieval range decision unit 14 will be described. FIG. 5 explains the operation of the learned pattern detector 13 and the retrieval range decision unit 14.

After the nearest cluster $C_{MinClass}$ is obtained, the learned pattern detector 13 compares the retrieval pattern q with all the learned patterns that belong to the nearest cluster $C_{MinClass}$ and obtains a learned pattern $P_{MinClass}$ distance between which and the retrieval pattern is the minimum.

An circle Ed having a radius R composed of the distance between the cluster $C_{MinClass}$ and the retrieval pattern q and the distance between the learned pattern $P_{MinClass}$ and the retrieval pattern q obtained by the learned pattern detector 13 is also obtained.

Next, the retrieval range decision unit 14 checks to see whether a cluster overlapped with the circle Ed exists or not. As information required for retrieval such as distance between clusters is stored in the retrieval dictionary, it is already-known.

Therefore, the retrieval range decision unit can determine that a cluster $C_k$ is not overlapped with the circle Ed as shown in FIG. 5 and is outside the retrieval range. The retrieval range decision unit also recognizes that a cluster $C_h$ is overlapped with the circle Ed.

The retrieval range decision unit 14 next checks to see whether or not a cluster overlapped with a circle Ee (having a radius equivalent to distance between the retrieval pattern q and the learned pattern $P_{MinClass}$) exists. As the cluster $C_h$ is not overlapped with the circle Ee though the cluster is overlapped with the circle Ed, the retrieval range decision unit determines that the cluster $C_h$ exists outside a retrieval range and selects a cluster $C_i$ overlapped with the circles Ed and Ee.

The area of the cluster $C_i$ overlapped with the circle Ee is only an area Sa, however, as a pattern arranged in multidimensional space is considered, a part Sb having oblique lines including the area Sa and shown in FIG. 5 is obtained as a final retrieval range.

Afterward, the retrieval unit 15 retrieves the retrieval pattern q from among all the learned patterns that belong to the retrieval range Sb. The algorithm of operation such as the detection of the nearest cluster and the decision of a retrieval range will be described in detail later using mathematical formulae.

As described above, in the retrieval system 1 according to the present invention, the retrieval dictionary is generated beforehand, the nearest cluster to an input retrieval pattern is detected based upon the retrieval dictionary, and a learned pattern which belongs to the nearest cluster and is the closest to the retrieval pattern is detected.

A retrieval range is gradually decided using the detected learned pattern and the retrieval dictionary and retrieval is executed in a finally obtained retrieval range.

Therefore, as retrieval is not executed depending upon the definition of distance between patterns, a method of calculating it, a method of representing a pattern and a method of classifying patterns into clusters respectively set as heretofore, retrieval speed and retrieval precision are enhanced and reliable retrieval is enabled.

Figure 6:
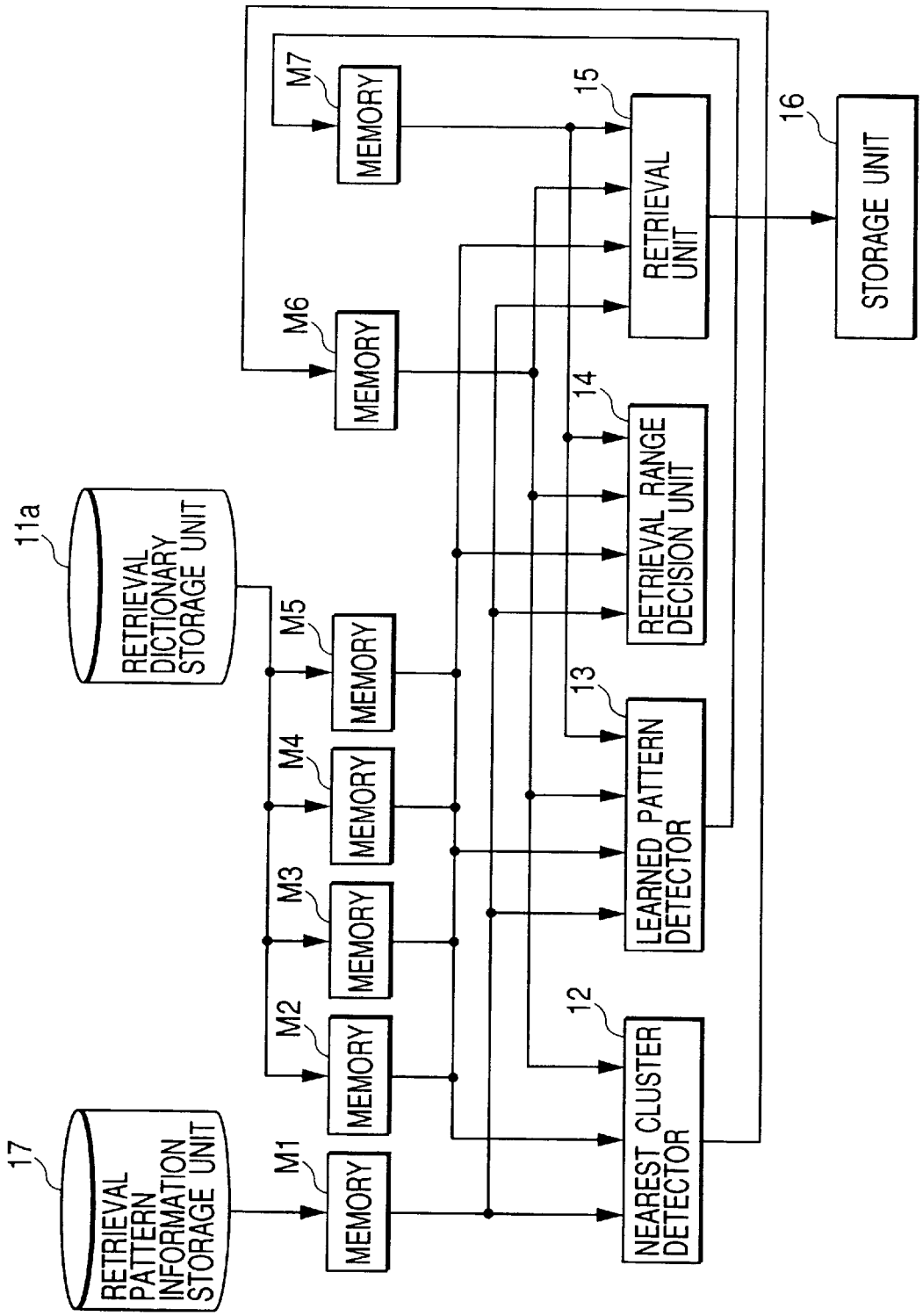
FIG. 6 shows the configuration of the retrieval system.
Figure 7:
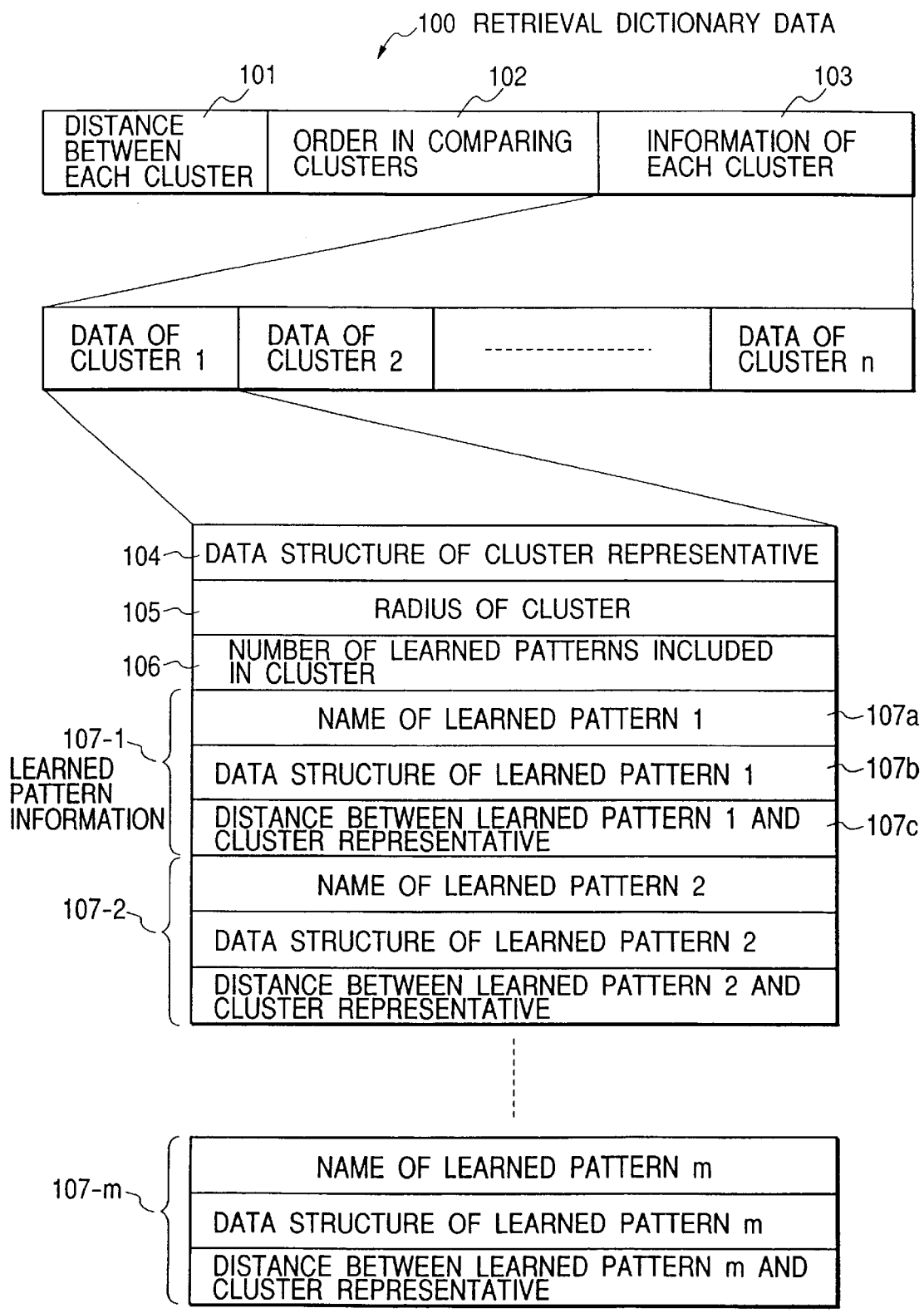
FIG. 7 shows the data structure in a retrieval dictionary.

Next, referring to FIGS. 6 and 7, the detailed configuration of the retrieval system 1 according to the present invention will be described. FIG. 6 shows the configuration of the retrieval system 1.

A retrieval pattern information storage 17 stores the information of retrieval patterns. The information of retrieval patterns is composed of the name and the data structure of the retrieval pattern.

The data structure of a pattern is different depending upon a method of representing a pattern. For example, if a pattern is represented based upon its feature, the feature is stored as the data structure of the pattern.

If a pattern is represented by a graph in graph theory, a weighted graph corresponding to the pattern is stored as the data structure of the pattern. A pattern itself may be also stored as the data structure of the pattern.

The retrieval dictionary storage 11a stores a retrieval dictionary generated by the retrieval dictionary generation unit 11. FIG. 7 shows retrieval dictionary data in the retrieval dictionary. As shown in FIG. 7, the retrieval dictionary data 100 has hierarchical structure.

The retrieval dictionary data 100 is composed of distance 101 between each cluster, order 102 in comparing clusters when the nearest cluster to a retrieval pattern is obtained, and the information of each cluster.

The information of each cluster 103 is composed of the data of clusters 1 to n. Each data is composed of the data structure 104 of a cluster representative, the radius 105 of the cluster, the number 106 of learned patterns which belong to the cluster and the information 107-1 to 107-m of plural learned patterns which belong to the cluster.

For example, learned pattern information 107-1 is composed of the name 107a of a learned pattern 1, the data structure 107b of the learned pattern 1, and the distance 107c between the learned pattern 1 and its cluster representative. Learned pattern information 107-2 to 107-m is also similarly composed.

Memory M1 stores the name and the data structure of one retrieval pattern read from the retrieval pattern information storage 17.

Memories M2 to M4 respectively store the data structure 104 of a cluster representative, the radius 105 of the cluster and the number 106 of learned patterns which belong to the cluster. Memory M5 stores learned pattern information 107-1 to 107-m.

Memories M6 and M7 respectively store the information of the nearest cluster to the retrieval pattern (the distance and the number of the cluster) and the information of the most similar learned pattern to the retrieval pattern (the name of the learned pattern and the distance).

The nearest cluster detector 12 obtains the nearest cluster to the retrieval pattern stored in the memory M1 using the retrieval dictionary stored in the retrieval dictionary storage 11a and instructs the memory M6 to store the result.

The learned pattern detector 13 compares all the learned patterns that belong to the nearest cluster stored in the memory M6 with the retrieval pattern stored in the memory M1, obtains a learned pattern for which the distance from the retrieval pattern is the minimum and instructs the memory M7 to store the name of the obtained learned pattern and the minimum distance.

The retrieval range decision unit 14 decides a retrieval range using the distances between clusters stored in the retrieval dictionary, the radius of each cluster and the minimum distance stored in the memory M7.

The retrieval unit 15 retrieves the most similar pattern by comparing all the learned patterns that belong to the retrieval range obtained by the retrieval range decision unit 14 with the retrieval pattern stored in the memory M1.

The storage 16 stores the name and the data structure of the similar pattern retrieved by the retrieval unit 15.

Figure 8:
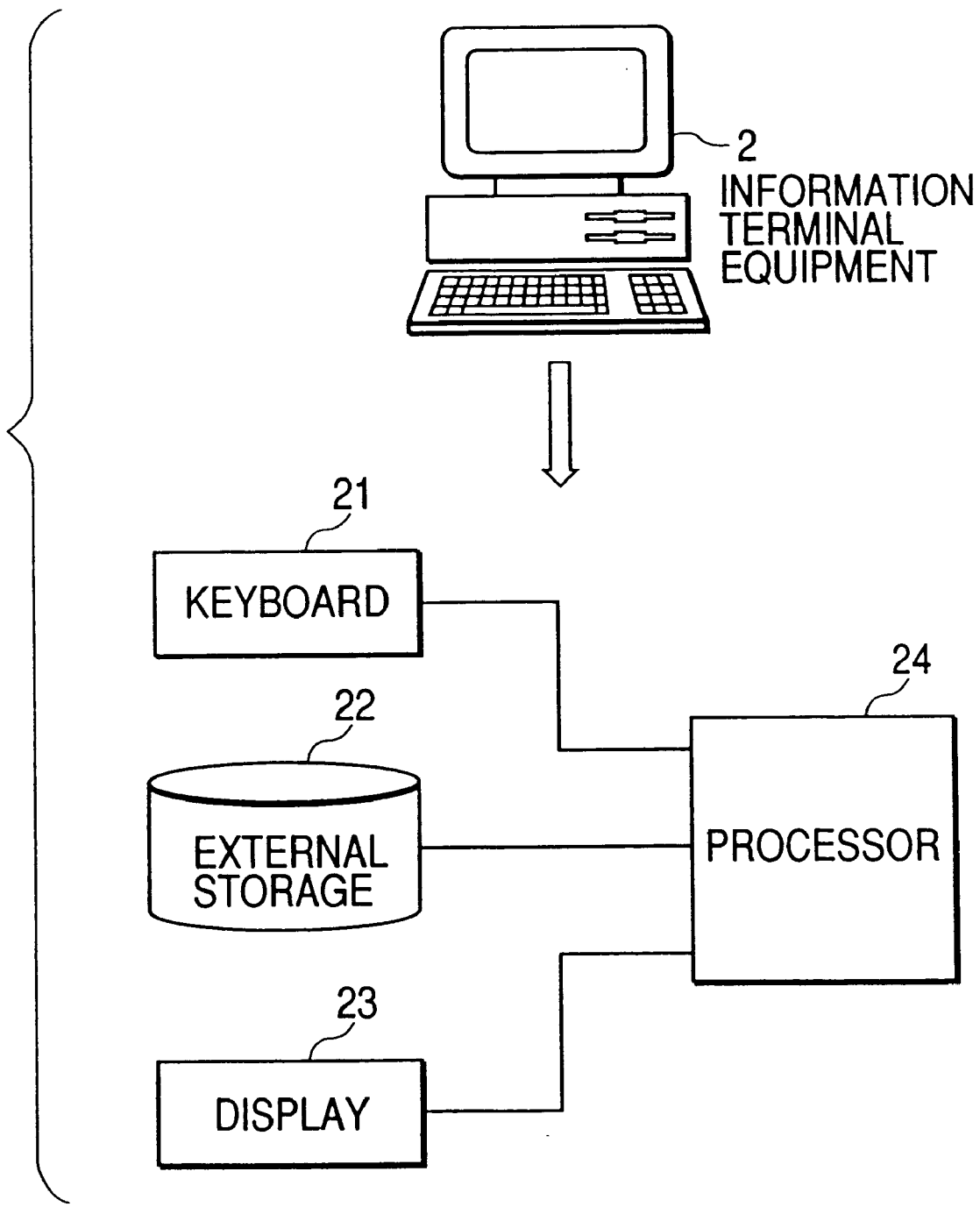
FIG. 8 shows the configuration of the system in case the retrieval system is applied to information terminal equipment.

Next, the configuration of the retrieval system 1 in case it is applied to information terminal equipment will be described. FIG. 8 shows the configuration of the retrieval system 1 in case it is applied to information terminal equipment.

Information terminal equipment 2 is composed of a keyboard 21, an external storage 22, a display 23 and a processor 24.

The keyboard 21 is an input device for a user to instruct operation and another input device may be also added.

The external storage 22 stores the data structure of a retrieval pattern, the retrieval dictionary, the result of retrieval and software.

Also, the retrieval pattern information storage 17 and the retrieval dictionary storage 11a can be composed as a part of the external storage 22. Furthermore, the storage 16 may also store the name and the data structure of the retrieved similar pattern.

Concretely, the external storage 22 can be composed of a hard disk for example. The display 23 is an output device for displaying a message to a user, the data of a retrieval pattern, the result of retrieval and others.

The processor 24 executes actual processing according to software stored in the external storage 22 and others. The processor 24 can be concretely composed of a computer system such as a microprocessor and a personal computer.

The nearest cluster detector 12, the learned pattern detector 13, the retrieval range decision unit 14 and the retrieval unit 15 can be composed of software which is run in the processor 24.

Next, the operation of the retrieval system 1 according to the present invention will be described further in detail. First, a retrieval pattern stored in the retrieval pattern information storage 17 will be described.

The data structure of retrieval patterns stored in the retrieval pattern information storage 17 is different depending upon a method of representing a pattern, the definition of distance and its calculation method.

For example, in the case of a character pattern, a voice pattern, a fingerprint pattern and a face pattern, the features of each pattern are stored as the data structure of a retrieval pattern.

The molecular structure of a compound and the secondary structure of RNA can be represented in a weighted graph and the respective weighted graphs are stored as the data structure of a retrieval pattern.

In the case of a coordinate graphic pattern, the contour data of coordinate graphics, the data of coordinate graphics itself and others are stored as the data structure of a retrieval pattern.

The data structure of a pattern relates to a method of representing the pattern, the definition of distance and its calculation method. Concretely, as for Euclidean distance for a character pattern for example, Euclidean distance between patterns $p_i$ and $p_j$ is calculated according to the following formula (1) in case the feature of the pattern $p_i$ is represented by $(p_{i1}, p_{i2}, \text{- - -} p_{im})$

[Formula 1]

$$d(p_i, p_j) = \sqrt{\sum_{k=1}^{m} (p_{ik} - p_{jk})^2} \qquad (1)$$

Next, a method of classifying learned patterns when a learned pattern is stored in the retrieval dictionary storage 11a will be described. The retrieval dictionary storage 11a stores the retrieval dictionary described in relation to FIG. 7.

As for a method of classifying learned patterns, an arbitrary classification method corresponding to a pattern to be processed can be selected from among methods of classifying patterns generally announced.

As for a character pattern for example, there is a longest distance clustering method. In the farthest neighbor method, the farthest distance among the distances between arbitrary two patterns in each cluster is defined as distance between clusters and two clusters for which the above distance is the minimum are integrated. Distance between two clusters $C_i$ and $C_j$ is defined according to the following formula (2).

[Formula 2]

$$d(C_i, C_j) = \{\max\ d(p_i, p_j) | p_i \epsilon C_i,\ p_j \epsilon C_j\} \qquad (2)$$

Next, a method of obtaining the representative of cluster stored in the retrieval dictionary storage 11a will be described. As for a method of obtaining the representative of a cluster, in case a pattern is represented by its features, the mean value of features in each dimension of all the learned patterns that belong to the cluster is obtained and the obtained mean value of the features is defined as the representative of the cluster.

Also, in case a pattern is represented by a method except features, distance between each learned pattern which belongs to a cluster is calculated and a learned pattern which is the smallest in the sum of distance between each learned pattern in the corresponding cluster is defined as the representative of the cluster.

Next, a method of obtaining the radius of a cluster stored in the retrieval dictionary storage 11a will be described. As for the method of obtaining the radius of a cluster, distance between each learned pattern which belongs to the cluster and the representative of the corresponding cluster is calculated and the maximum distance is defined as the radius of the cluster. Distance between the representatives of clusters is defined as distance between the clusters, and distance between a pattern and the representative of a cluster is defined as distance between the pattern and the cluster.

Next, order in comparing clusters when the nearest cluster to a retrieval pattern stored in the retrieval dictionary storage 11a is obtained will be described.

As for order in comparing clusters when the nearest cluster to a retrieval pattern is obtained, in case a pattern is represented by its features, the mean value of features in each dimension of the representative of all clusters is obtained and a cluster the closest to the obtained mean value of the features is first compared.

If a pattern is represented by a method except its features, a cluster which is the smallest in the sum of distances between that and all clusters is first compared. Distance between the first compared cluster and another cluster is sorted in ascending order and the sorted order is defined as subsequent order in comparing clusters.

Next, the nearest cluster detector 12 will be described. The nearest cluster detector 12 obtains the nearest cluster to a retrieval pattern stored in the memory M1 using the retrieval dictionary.

When the nearest cluster to a retrieval pattern is obtained, the retrieval pattern is not compared with all clusters but the nearest cluster is obtained, checking to see whether a cluster is included in a comparison range or not.

Order in determining clusters is equivalent to order in comparing clusters stored in the retrieval dictionary. That is, clusters are compared in order (for example, the order of the clusters C2 to C6 described in relation to FIG. 2) in which they are nearer to the center (for example, the cluster C1 described in relation to FIG. 2) of multidimensional space composed of samples of learned patterns. Hereby, a frequency in which clusters are compared is reduced and the nearest cluster can be obtained at high speed.

Concretely, an initial value of a range in which clusters are compared is all clusters stored in the retrieval dictionary. One cluster is selected in order in comparing clusters stored in the retrieval dictionary and it is checked whether the selected cluster is included in the range for comparing clusters or not.

If the selected cluster is included, distance between the representative of the cluster and a retrieval pattern is calculated and a cluster near to the retrieval pattern is obtained.

Afterward, a range in which clusters are to be compared next is decided using the minimum distance currently obtained between the retrieval pattern and a cluster and distance between each cluster stored in the retrieval dictionary. Formula (3) shows a condition for checking whether a cluster is included in a comparison range or not.

[Formula 3]

$$D(C_{MinClass}, C_{S(i)}) < 2*D_{MinC} \qquad (3)$$

$C_{MinClass}$ shows the nearest cluster currently obtained. $D_{MinC}$ shows the distance between a retrieval pattern and the cluster $C_{MinClass}$, and the maximum value is set as an initial value. The above maximum value means the upper limit of a range of values which the type of $D_{MinC}$ variables can represent in a computer. S(i) shows the number of an 'i'th cluster in order in comparing clusters stored in the retrieval dictionary.

A cluster which does not satisfy the formula (3) is not required to be compared because distance between the cluster and a retrieval pattern is larger than $D_{MinC}$.

$D_{MinC}$ becomes smaller by repeating comparison between a retrieval pattern and a cluster as described above and therefore, a set of clusters which satisfy the formula (3) becomes smaller.

Figure 9:
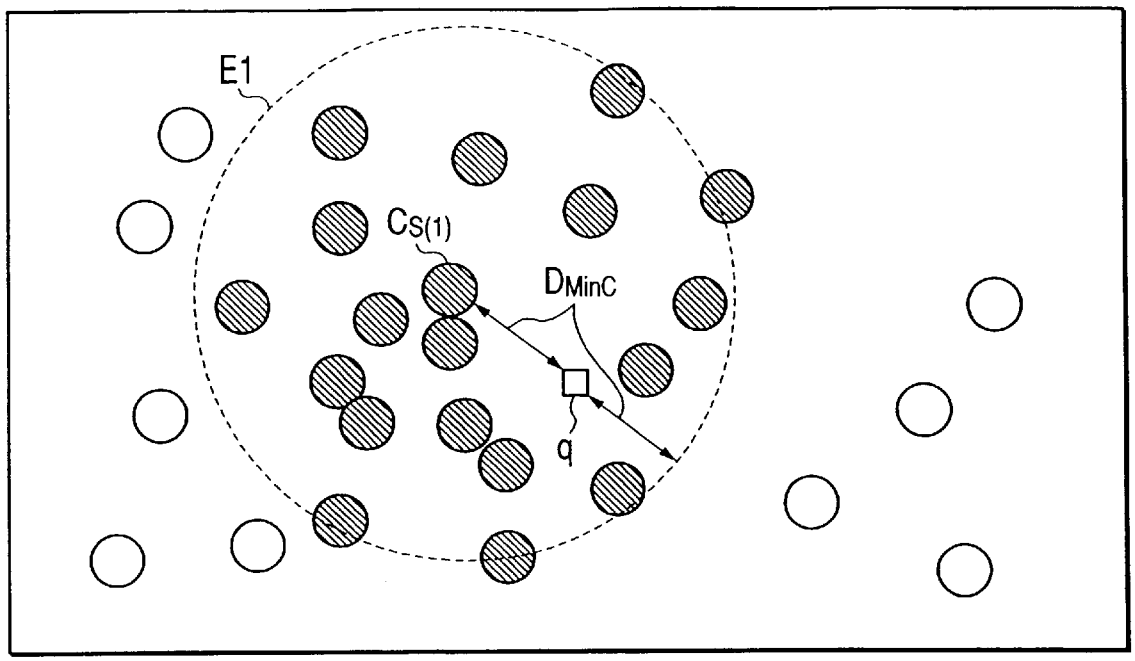
FIG. 9 explains the operation of the nearest cluster detector.
Figure 10:
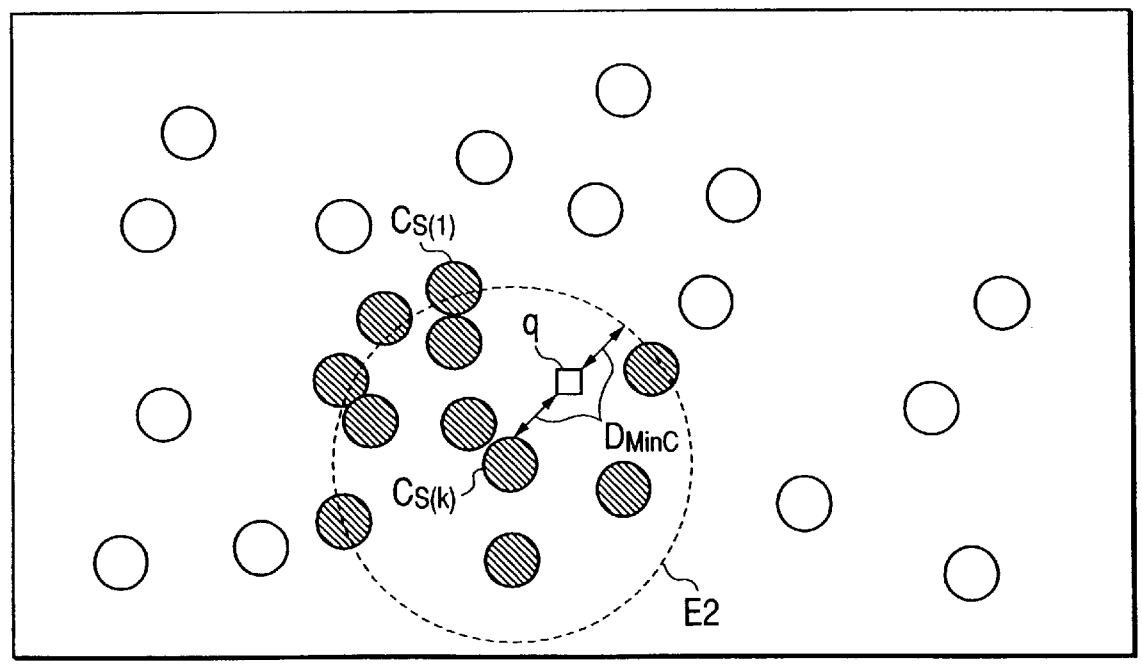
FIG. 10 explains the operation of the nearest cluster detector.

Therefore, the nearest cluster to a retrieval pattern can be obtained at high speed. The number of the obtained nearest cluster and the minimum distance are stored in the memory M6. FIGS. 9 and 10 explain the operation of the nearest cluster detector 12. First, as shown in FIG. 9, distance between the retrieval pattern q and cluster $C_{S(1)}$ is calculated and the distance is stored as $D_{MinC}$ so that MinClass is S(1).

At this time, a set of clusters which satisfy the formula (3) means the clusters included in a dotted circle E1. That is, the next comparison range is equal to the dotted circle E1.

FIG. 10 shows a set of clusters (clusters included in a dotted circle E2) which satisfy the formula (3) after the retrieval pattern q and a cluster $C_{S(k)}$ are compared.

Figure 11:
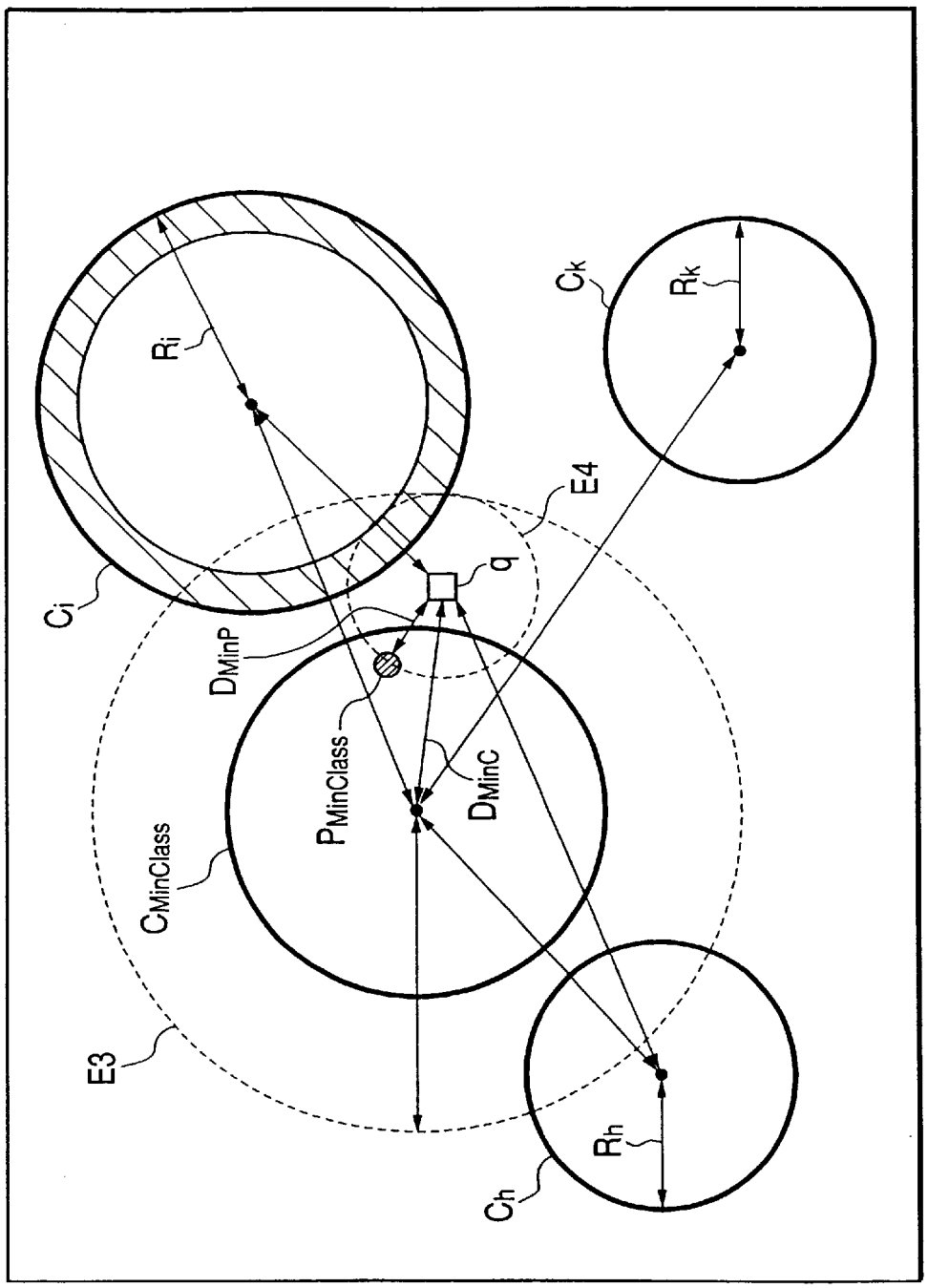
FIG. 11 explains the operation of the learned pattern detector and the retrieval range decision unit.

Next, the operation of the learned pattern detector 13 and the retrieval range decision unit 14 will be described. FIG. 11 explains the operation of the learned pattern detector 13 and the retrieval range decision unit 14.

The learned pattern detector 13 compares all the learned patterns that belong to the nearest cluster $C_{MinClass}$ obtained by the nearest cluster detector 12 and a retrieval pattern and obtains a learned pattern $P_{minClass}$ which is the nearest. The obtained minimum distance is stored as $D_{MinP}$ in the memory M7.

As shown in FIG. 11, it is considered based upon the result of detection by the nearest cluster detector 12, that of detection by the learned pattern detector 13, $D_{MinC}$, and $D_{MinP}$ that the retrieval range is the learned patterns included in a dotted circle E3.

Therefore, the retrieval range decision unit 14 first obtains a range in which clusters are retrieved and next, checks whether learned patterns which belong to a cluster in the retrieval range are required to be retrieved or not.

Next, the final learned pattern retrieval range in which learned patterns which belong to a cluster required to be retrieved is decided. Afterward, the retrieval unit 15 retrieves the most similar learned pattern to the retrieval pattern in the range in which the learned patterns are retrieved. The retrieval range of clusters is equivalent to a set of clusters which satisfy the following formula (4).

[Formula 4]

$$D(C_{MinClass}, C_i) < D(q, C_{MinClass}) + D_{MinP} + R_i \qquad (4)$$

$R_i$ shows the radius of cluster $C_i$. It means being outside the dotted circle E3 shown in FIG. 11 that the formula (4) is not satisfied.

A cluster ($C_k$) located outside the dotted circle E3 is not required to be retrieved because it is clear that distance between a learned pattern which belongs to the cluster and the retrieval pattern q is lager than $D_{MinP}$.

Clusters $C_i$ and $C_h$ shown in FIG. 11 satisfy the formula (4). To check how a cluster which satisfies the formula (4) is apart from the retrieval pattern q and whether a learned pattern which belongs to the cluster is required to be retrieved or not, that is, whether the cluster is overlapped with a dotted circle E4 or not, distance D (q, $C_i$) between the retrieval pattern q and the cluster $C_i$ which satisfies the formula (4) is calculated.

As the cluster is overlapped with the dotted circle E4 if the distance satisfies the following formula (5), the learned pattern which belongs to the cluster is required to be retrieved.

[Formula 5]

$$D(q, C_i) < D_{MinP} + R_i \qquad (5)$$

It means being not overlapped with the dotted circle E4 though the above cluster is overlapped with the dotted circle E3 shown in FIG. 11 that the formula (4) is satisfied and the formula (5) is not satisfied.

As distance between a learned pattern which belongs to such a cluster ($C_h$) and the retrieval pattern q is larger than $D_{MinP}$, the cluster is not required to be retrieved.

Therefore, the cluster $C_i$ shown in FIG. 11 satisfies the formulae (4) and (5).

All the learned patterns that belong to the obtained cluster that satisfies the formulae (4) and (5) are not required to be retrieved. That is, only learned patterns which may be included in the dotted circle E4 have only to be retrieved.

The learned pattern p which satisfies the following formula (6) is required to be retrieved because it may be included in the dotted circle E4.

[Formula 6]

$$D(p, C_i) > D(q, C_i) - D_{MinP} \qquad (6)$$

The cluster $C_i$ shown in FIG. 11 satisfies the formulae (4) and (5) and a part having oblique lines of the cluster $C_i$ includes learned patterns which satisfy the formula (6).

As described above, a retrieval range is finally obtained and the retrieval unit 15 executes retrieval in the retrieval range.

Figure 12:
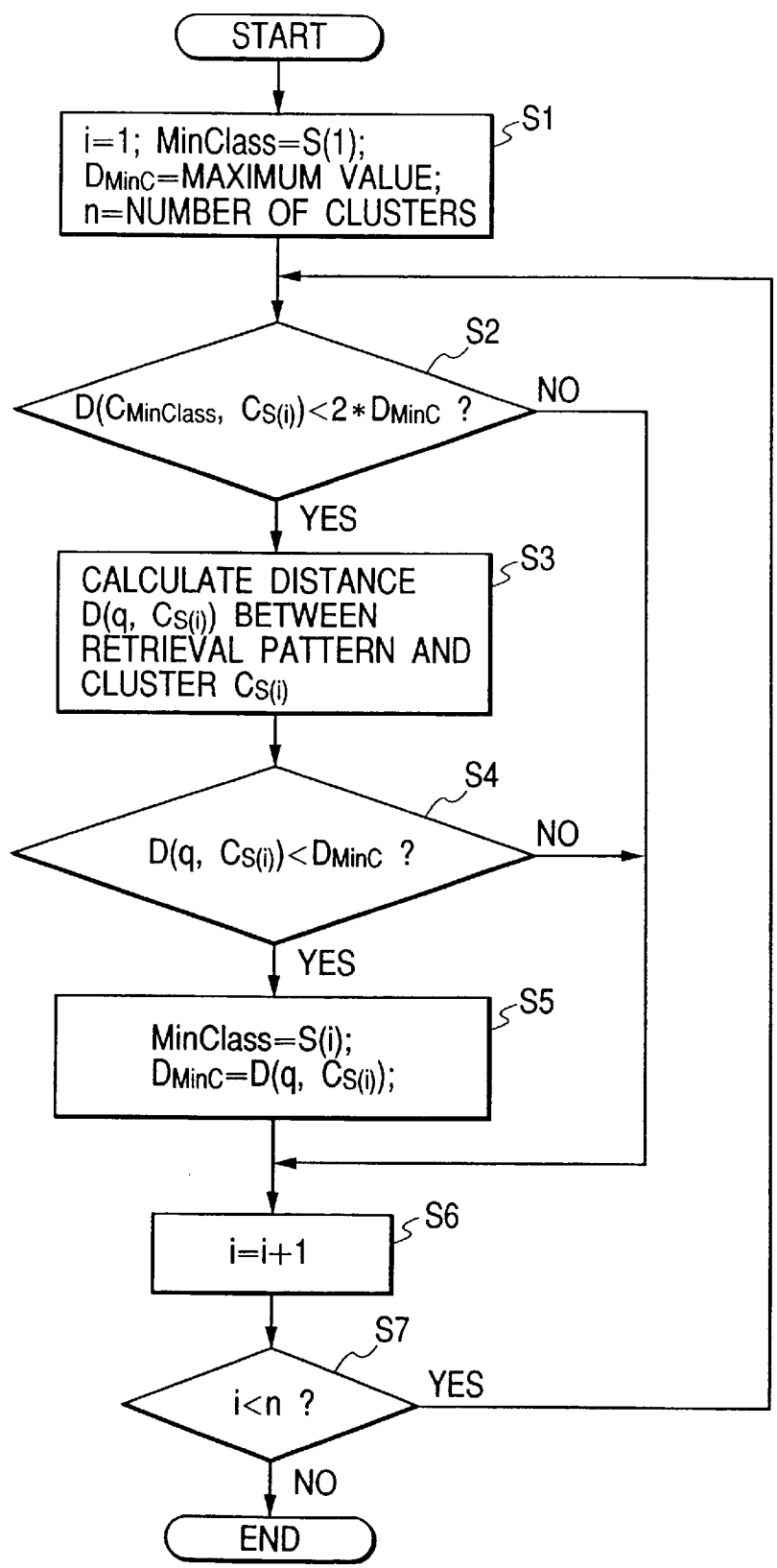
FIG. 12 is a flowchart showing a procedure for operating the nearest cluster detector.

Next, the operation of the nearest cluster detector 12 will be described using a flowchart. FIG. 12 is a flowchart showing a procedure for the operation of the nearest cluster detector 12.

The nearest cluster detector 12 obtains the nearest cluster to the retrieval pattern q stored in the memory M1 using the retrieval dictionary.

[S1] Order i in comparing clusters is set to 1, the number MinClass of the nearest cluster to the retrieval pattern is set to S(i), distance $D_{MinC}$ between the retrieval pattern and the nearest cluster is set to the maximum value and the number of clusters is set to n. S(i) described above shows the number of a cluster to which order i in comparing clusters stored in the retrieval dictionary is allocated. The maximum value is equivalent to the upper limit of a range of values which the type of $D_{MinC}$ variables can represent in a computer.

[S2] It is checked whether the cluster $C_{S(i)}$ satisfies the formula (3) or not. That is, it is checked whether the retrieval pattern is required to be compared with $C_{S(i)}$ or not. If $C_{S(i)}$ satisfies the formula (3), processing proceeds to step S3 and if $C_{S(i)}$ does not satisfy the formula (3), processing proceeds to step S6.

[S3] Distance between the retrieval pattern q and the cluster $C_{S(i)}$ is calculated.

[S4] Compare the distance obtained in step S3 with the minimum distance currently obtained, if the distance is smaller, processing proceeds to step S5 and if not, processing proceeds to step S6.

[S5] The name of the nearest cluster to the retrieval pattern and the distance between the retrieval pattern and the nearest cluster are rewritten.

[S6] A cluster to be compared next is set.

[S7] It is checked whether all clusters are processed or not. If all clusters are not processed, processing is returned to step S2 and if all clusters are processed, processing is terminated.

Figure 13:
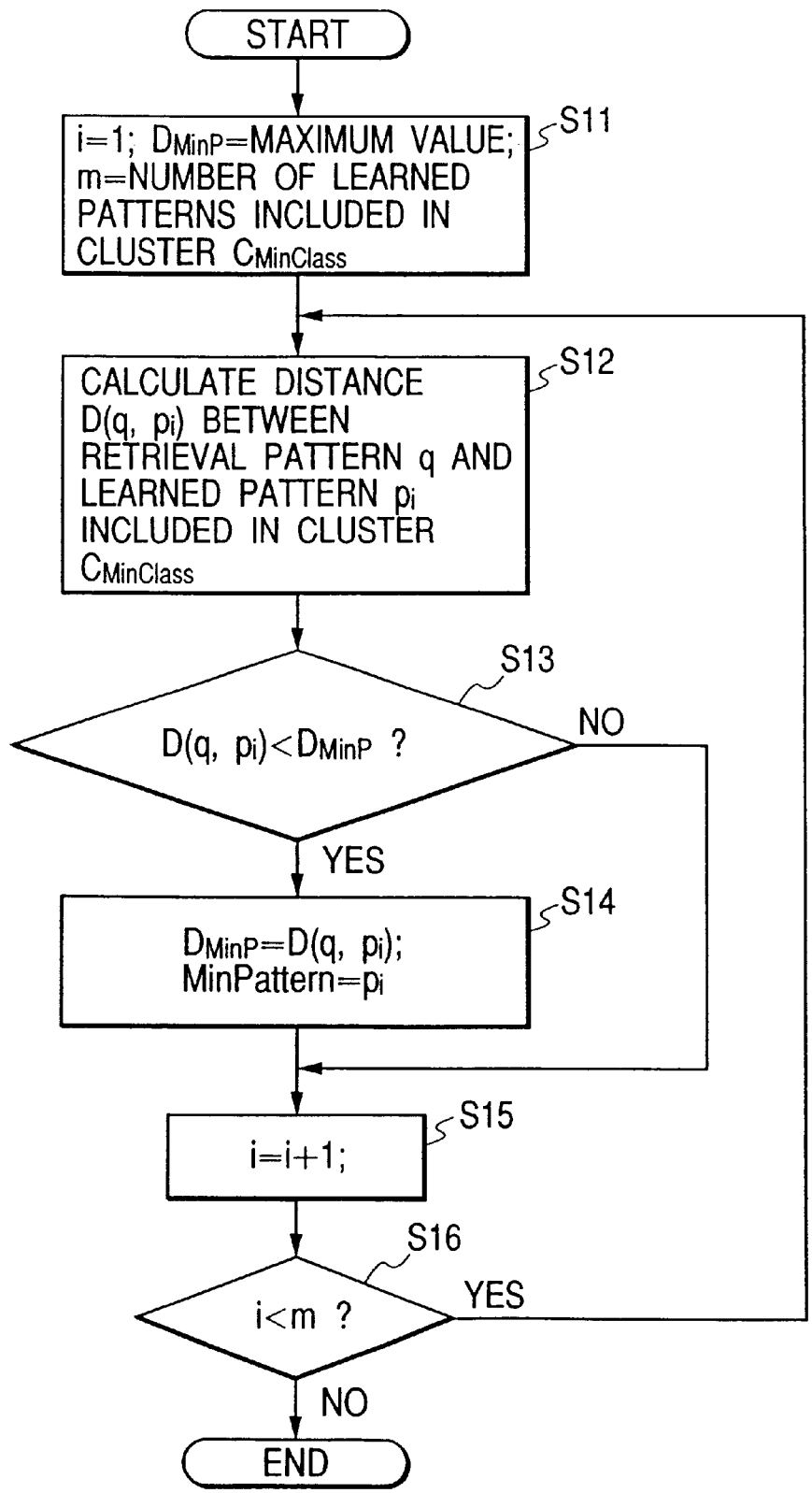
FIG. 13 is a flowchart showing a procedure for operating the learned pattern detector.

Next, the operation of the learned pattern detector 13 will be described using a flowchart. FIG. 13 is a flowchart showing a procedure for the operation of the learned pattern detector 13.

The learned pattern detector 13 obtains a learned pattern distance from the retrieval pattern q which is the minimum among learned patterns which belong to the nearest cluster $C_{MinClass}$ to the retrieval pattern.

[S11] The number i of a learned pattern is set to 1 and distance $D_{MinP}$ between the learned pattern and the retrieval pattern is set to the maximum value.

[S12] Distance $D(q, p_i)$ between the retrieval pattern q and the learned pattern $p_i$ which belongs to the cluster $C_{MinClass}$ is calculated.

[S13] The distance obtained in step S12 and $D_{MinP}$ are compared, if the distance is smaller than $D_{MinP}$, processing proceeds to step S14 and if not, processing proceeds to step S15.

[S14] $D_{MinP}$ and the name of the learned pattern are rewritten.

[S15] The number of a learned pattern is incremented by 1.

[S16] It is checked whether all the learned patterns are processed or not. If all the learned patterns are not processed, processing is returned to step S12. If all the learned patterns are processed, processing is terminated.

Next, the operation of the retrieval range decision unit 14 and the retrieval unit 15 will be described using a flowchart.

Figure 14:
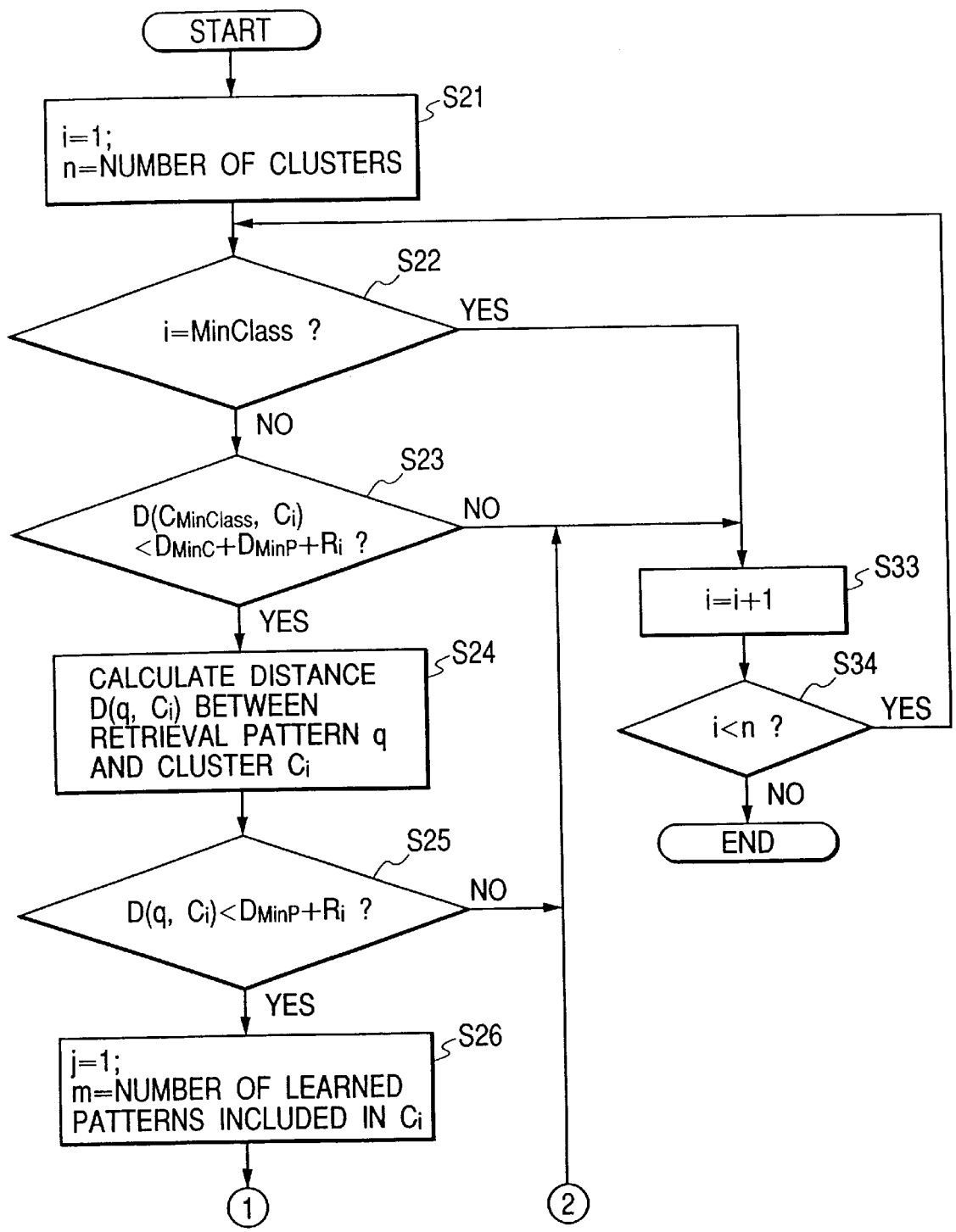
FIG. 14 is a flowchart showing a procedure for operating the retrieval range decision unit and a retrieval unit.
Figure 15:
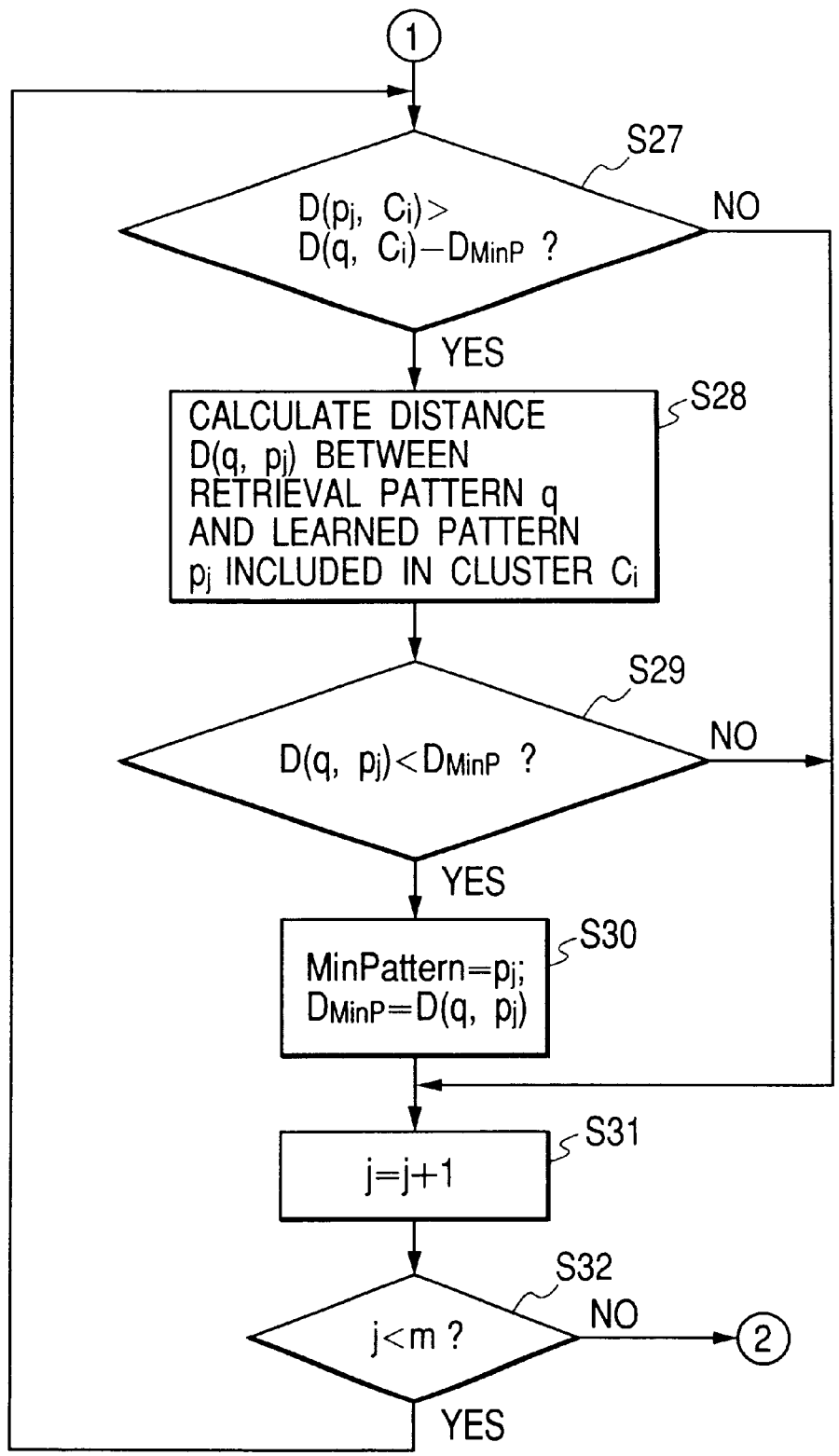
FIG. 15 is a flowchart showing a procedure for operating the retrieval range decision unit and the retrieval unit.

FIGS. 14 and 15 are flowcharts showing a procedure for the operation of the retrieval range decision unit 14 and the retrieval unit 15.

The retrieval range decision unit 14 decides a retrieval range and the retrieval unit 15 retrieves the most similar learned pattern by comparing each learned pattern in the range and the retrieval pattern.

[S21] The number i of a cluster is set to 1 and the number of clusters is set to n.

[S22] It is checked whether the cluster $C_i$ is $C_{MinClass}$ or not. If $C_i$ is $C_{MinClass}$, processing proceeds to step S33 and if not, processing proceeds to step S23.

[S23] It is checked whether the cluster satisfies the formula (4) or not. If the cluster satisfies the formula (4), processing proceeds to step S24 and if not, processing proceeds to step S33.

[S24] Distance $D(q, C_i)$ between the retrieval pattern q and the cluster $C_i$ is calculated.

[S25] It is checked whether the distance obtained in step S24 satisfies the formula (5) or not. If the distance satisfies the formula (5), processing proceeds to step S26 and if not, processing proceeds to step S33.

[S26] The number j of a learned pattern is set to 1 and the number of learned patterns which belong to the cluster $C_i$ is set to m.

[S27] It is checked whether a learned pattern $p_j$ satisfies the formula (6) or not. That is, it is checked whether $p_j$ is required to be retrieved or not. If the learned pattern satisfies the formula (6), processing proceeds to step S28 and if not, processing proceeds to step S31.

[S28] Distance between the retrieval pattern q and $p_j$ is calculated.

[S29] It is checked whether the distance obtained in step S28 is the minimum or not. If the distance is the minimum, processing proceeds to step S30 and if not, processing proceeds to step S31.

[S30] $D_{MinP}$ and the name of the similar pattern are rewritten.

[S31] The number of a learned pattern is incremented by 1.

[S32] If all the learned patterns that belong to $C_i$ are not processed, processing is returned to step S27. If all the learned patterns are processed, processing proceeds to step S33.

[S33] The number of a cluster is incremented.

[S34] If all clusters are processed, processing is terminated and if not, processing is returned to step S22.

Next, retrieval speed and retrieval precision when a character pattern is concretely retrieved using the retrieval system 1 according to the present invention will be described.

As for a character pattern, a character image printed on paper is input to a computer via a scanner.

Figure 16:
FIG. 16 shows a part of character pattern clusters.

Also, a character pattern is represented by a peripheral feature and difference between character patterns is represented by Euclidean distance between the character patterns. FIG. 16 shows a part of a cluster in case 3355 pieces of character patterns are grouped up to 500 clusters by the farthest neighbor method. FIG. 16 shows a part of the cluster including, character patterns.

The representative and the radius of each cluster and the distances between clusters are obtained and the retrieval dictionary is generated. 10065 unlearned patterns (retrieval patterns) are retrieved using the retrieval dictionary by a round robin retrieval method and by the retrieval system 1 according to the present invention.

As a result, in the case of the round robin retrieval method, retrieval precision is 100% and a retrieval speed is 3355 times, while in case the retrieval system 1 according to the present invention is used, retrieval precision is 100% and a retrieval speed is 815.90 times.

As described above, the retrieval precision is 100% in both cases, however, retrieval speed in the present invention is speed up by 4.11 times of the round robin retrieval method. Retrieval precision and retrieval speed are respectively defined in the following formulae (7) and (8).

[Formula 7]

Retrieval precision={number of (retrieval result=retrieval result in round robin retrieval method)/(total number of retrieved character patterns)}×100%  (7)

[Formula 8]

Retrieval speed=(sum of frequencies of calculating distance when patterns are retrieved)/(total number of retrieved character patterns)  (8)

As described above, according to the present invention, the most similar pattern to a retrieval pattern can be precisely retrieved at high speed. Particularly, the retrieval precision of the retrieval system 1 according to the present invention does not depend upon a method of representing a pattern, the definition of distance between patterns, its calculation method and a method of classifying patterns.

Therefore, a problem that an unknown pattern in a pattern recognition field cannot be completely recognized can be partially solved, and a problem when a data which has structure is retrieved at high speed among a large quantity of data having structure or a problem when data having similar structure is retrieved at high speed and others can be solved.

Figure 17:
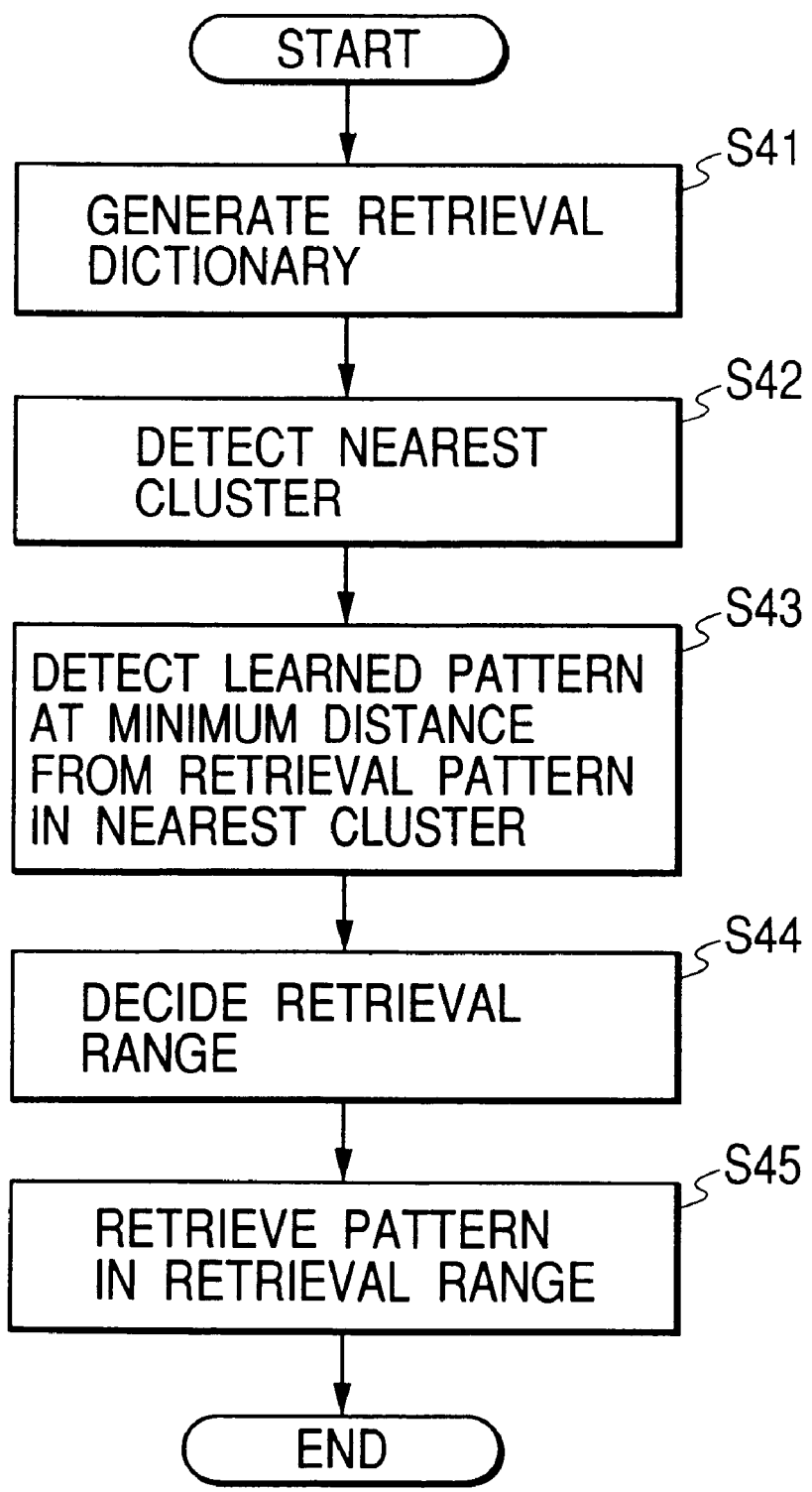
FIG. 17 is a flowchart showing a procedure for processing a detection method according to the present invention.
Figure 18A:
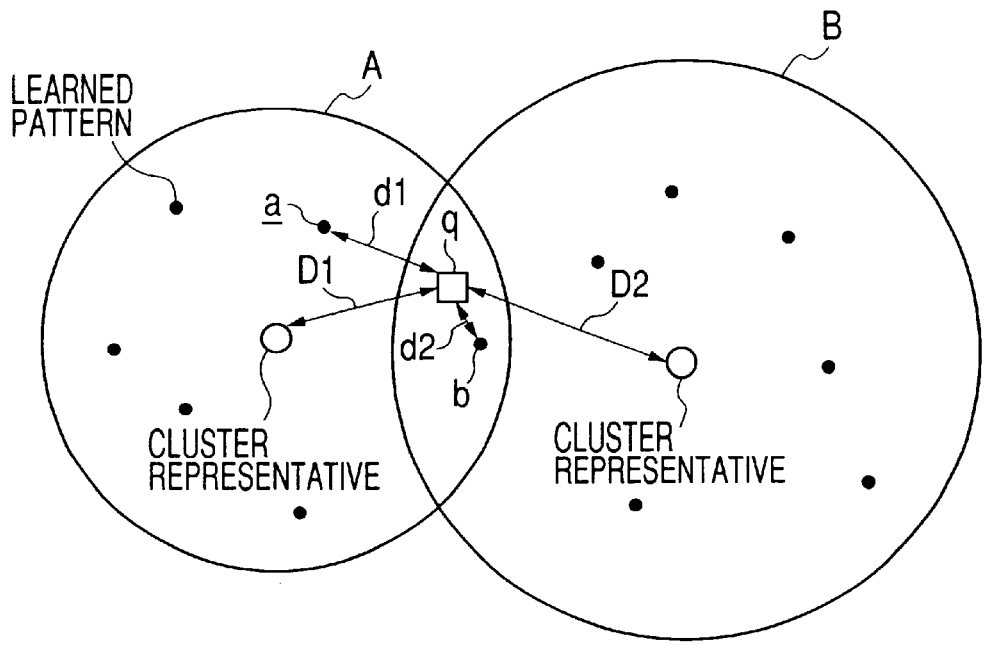
FIGS. 18A and 18B show a problem of precision in a rough classification retrieval method.
Figure 18B:
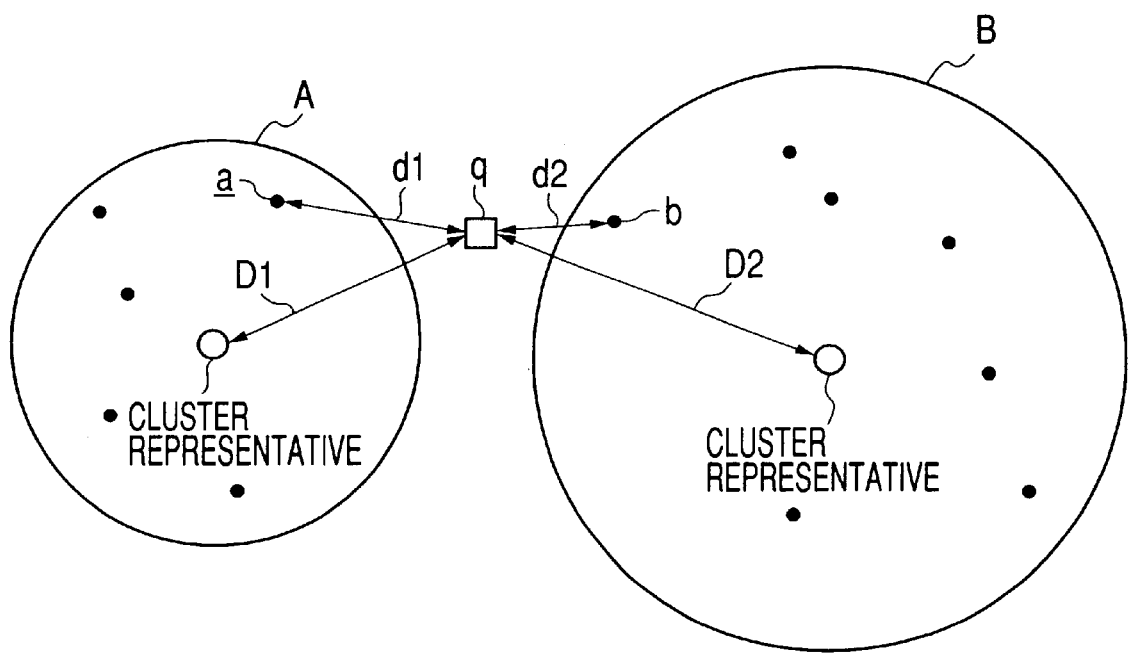

Next, a retrieval method according to the present invention will be described. FIG. 17 is a flowchart showing a procedure for processing by a retrieval method according to the present invention.

[S41] Classifying learned patterns into plural clusters, using the clusters to generate a retrieval dictionary.

[S42] The nearest cluster to an input retrieval pattern is detected among the clusters stored in the retrieval dictionary.

[S43] A learned pattern at the minimum distance from the retrieval pattern is detected by comparing all the learned patterns that belong to the nearest cluster with the retrieval pattern.

[S44] A retrieval range is decided using the learned pattern and the retrieval dictionary.

[S45] The retrieval pattern is retrieved among all the learned patterns that belong to the retrieval range.

As described above, the retrieval method according to the present invention is a method of classifying learned patterns into plural clusters, generating the retrieval dictionary using the clusters, detecting the nearest cluster to the input retrieval pattern based upon the retrieval dictionary, detecting a learned pattern at the minimum distance from the retrieval pattern in the nearest cluster, deciding the pattern retrieval range using the detected learned pattern and the retrieval dictionary and executing retrieval.

Hereby, high-speed and high-precision retrieval is enabled without depending upon distance between patterns, a representation method and a classification method.

A computer program for realizing the function of the above retrieval system 1 and retrieval method can be stored on a recording medium such as a semiconductor memory and a magnetic recording medium.

Hereby, the program can be also circulated on the market with the program stored on a portable recording medium such as CD-ROM and a floppy disk, can be also stored in a storage of a computer connected via a network and transferred to another computer via the network.

When the program is run on a computer, it is stored in a hard disk and others in the computer, is loaded into a main memory and is executed.

As described above, the retrieval system according to the present invention is composed so that it classifies learned patterns into plural clusters, generates a retrieval dictionary by the clusters, detects the nearest cluster to an input retrieval pattern based upon the retrieval dictionary, detects a learned pattern at predetermined distance from the retrieval pattern in the nearest cluster, decides a retrieval range using the detected learned pattern and the retrieval dictionary and executes retrieval. Hereby, high-speed and high-precision retrieval is enabled without depending upon distance between patterns, a representation method and a classification method.

What is claimed is:

1. A retrieval system that executes pattern retrieval, comprising:

a retrieval dictionary generation unit that classifies learned patterns into plural clusters, and generates a retrieval dictionary using the clusters;

a nearest cluster detector that detects the nearest cluster to an input retrieval pattern among said clusters based upon said retrieval dictionary;

a learned pattern detector that compares each learned pattern which belongs to the nearest cluster with said retrieval pattern and detects a learned pattern at predetermined distance from said retrieval pattern;

a retrieval range decision unit that decides a retrieval range using said learned pattern detected by said learned pattern detector and said retrieval dictionary; and a retrieval unit that retrieves said retrieval pattern among all the learned patterns in said retrieval range.

2. The retrieval system according to claim 1, wherein:

said retrieval dictionary generation unit classifies all the said learned patterns into plural clusters based upon distance between said learned patterns, obtains the representative of said clusters, calculates the radius of said clusters, distance between said clusters, distance between said learned pattern and said clusters, obtains order in comparing said clusters when the nearest cluster with said retrieval pattern is detected, and generates said retrieval dictionary.

3. The retrieval system according to claim 2, wherein:

said retrieval dictionary generation unit obtains the mean value of the features in each dimension of all the said learned patterns which belong to said cluster if a pattern is represented by its feature when the representative of said cluster is obtained, and sets obtained said mean value as the representative of said cluster.

4. The retrieval system according to claim 2, wherein:

said retrieval dictionary generation unit calculates distance between each learned pattern which belongs to said cluster if a pattern is represented by a thing other than its feature when the representative of said cluster is obtained, and sets, as the representative of said cluster, a learned pattern for which the sum of distance from said learned pattern to each learned pattern which belongs to said cluster is the minimum.

5. The retrieval system according to claim 2, wherein:

said retrieval dictionary generation unit calculates distance between each learned pattern which belongs to said cluster and the representative of said cluster when the radius of said cluster is obtained, and sets the maximum distance to the radius of said cluster.

6. The retrieval system according to claim 2, wherein:
said retrieval dictionary generation unit sets distance between the representatives of said clusters to distance between said clusters when distance between said clusters is obtained.

7. The retrieval system according to claim 2, wherein:
said retrieval dictionary generation unit sets distance between said learned pattern or said retrieval pattern and the representative of said cluster to distance between said learned pattern or said retrieval pattern and said cluster when distance between said learned pattern or said retrieval pattern and said cluster is obtained.

8. The retrieval system according to claim 2, wherein:
said retrieval dictionary generation unit obtains the mean value of said features in each dimension of the representatives of all the said clusters if a pattern is represented by its feature when order in comparing said clusters in case said nearest cluster is detected is obtained, and obtains comparison order such that a cluster in the vicinity of said obtained mean value is first compared.

9. The retrieval system according to claim 2, wherein:
said retrieval dictionary generation unit sets a cluster for which the sum of distance from said cluster to each cluster is the minimum to a cluster to be first compared if a pattern is represented by a thing other than its feature when order in comparing said clusters in case said nearest cluster is detected is obtained, sorts distance between said cluster to be first compared and another cluster in ascending order, and sets the sorted order as comparison order.

10. The retrieval system according to claim 2, wherein:
said retrieval dictionary generation unit has hierarchical structure and has distance between each of said clusters, order in comparing said clusters and the information of each cluster on a high order hierarchy; and
said information of each of said clusters is composed of the data structure of the representative of said clusters, the radius of said clusters, the number of learned patterns which belong to said clusters and the learned pattern information of said clusters.

11. The retrieval system according to claim 10, wherein:
said learned pattern information which said retrieval dictionary generation unit has is composed of the name of said learned pattern, the data structure of said learned pattern and distance between said learned pattern and said cluster representative.

12. The retrieval system according to claim 1, wherein:
said nearest cluster detector selects said clusters in order in comparing said clusters stored in said retrieval dictionary, calculates distance between said cluster representative and said retrieval pattern, obtains a cluster in the vicinity of said retrieval pattern, and reduces a range in which clusters are compared.

13. The retrieval system according to claim 12, wherein:
said nearest cluster detector sets the number of an 'i'th cluster in order in comparing clusters stored in said retrieval dictionary to S(i) when a range in which said clusters are compared is obtained, sets a cluster for which distance from said retrieval pattern on the way of detection is the minimum to $C_{MinClass}$, sets distance stored in said retrieval dictionary between $C_{MinClass}$ and a cluster $C_{s(i)}$ to D ($C_{MinClass}$, $C_{s(i)}$) and sets all clusters which satisfy a formula, D ($C_{MinClass}$, $C_{s(i)}$) $<2*D_{MinC}$ to a range in which said clusters are compared if distance obtained on the way of detection between the retrieval pattern and $C_{MinClass}$ is set to $D_{MinC}$.

14. A retrieval system according to claim 1, wherein:
said retrieval range decision unit obtains a retrieved range of clusters, checks to see whether or not learned patterns which belong to the clusters in said retrieved range are required to be retrieved and obtains a range in which said learned patters which belong to the cluster required to be retrieved are retrieved.

15. A retrieval system according to claim 14, wherein:
said retrieval range decision unit sets distance between the cluster $C_{MinClass}$ and a cluster $C_i$ to D ($C_{MinClass}$, $C_i$) when said range in which clusters are retrieved is obtained, sets distance between a retrieval pattern q and $C_{MinClass}$ to D (q, $C_{MinClass}$), sets the minimum distance obtained on the way of detection between said retrieval pattern and said learned pattern to $D_{MinP}$ and sets all the clusters that satisfy a formula, D ($C_{MinClass}$, $C_i$)<D (q, $C_{MinClass}$)+$D_{MinP}$+$R_i$ if the radius stored in said retrieval dictionary of the cluster $C_i$ is $R_i$ to said range in which clusters are retrieved.

16. The retrieval system according to claim 14, wherein:
said retrieval range decision unit determines that learned which belong to said cluster are required to be retrieved if a formula, D (q, $C_i$)<$D_{MinP}$+$R_i$ is satisfied in case distance D (q, $C_i$) between the retrieval pattern q and the cluster $C_i$ in said range in which clusters are retrieved is calculated when it is checked whether or not learned patterns which belong to each cluster in said range in which clusters are retrieved are required to be retrieved.

17. The retrieval system according to claim 14, wherein:
said retrieval range decision unit sets all the learned patterns that satisfy a formula, D (p, $C_i$)>D (q, $C_i$)−$D_{MinP}$ to a retrieval range if distance stored in said retrieval dictionary from a learned pattern p which belongs to the cluster $C_i$ to the representative of the cluster $C_i$ is D (p, $C_i$) when said range in which learned patterns are retrieved is obtained.

18. A retrieval method of executing pattern retrieval, wherein:
learned patterns are classified into plural clusters, and a retrieval dictionary is generated using said clusters;
the nearest cluster to an input retrieval pattern is detected among said clusters stored in said retrieval dictionary;
a learned pattern at predetermined distance from said retrieval pattern is detected by comparing all the learned patterns that belong to the nearest cluster with said retrieval pattern;
a retrieval range is decided using said learned pattern and said retrieval dictionary; and
said retrieval pattern is retrieved from among all the learned patterns in said retrieval range.

19. A retrieval method according to claim 18, wherein:
said cluster is selected in order in comparing said clusters stored in said retrieval dictionary when said nearest cluster is detected;
distance between the representative of said cluster and said retrieval pattern is calculated;
a cluster in the vicinity of said retrieval pattern is obtained; and
a range in which clusters are compared is reduced.

20. A computer readable recording medium that records a retrieval program for instructing a computer to execute pattern retrieval, wherein:

the retrieval program instructs the computer to function as:

a retrieval dictionary generation unit that generates a retrieval dictionary for classifying learned patterns into plural clusters;

a nearest cluster detector that detects the nearest cluster to an input retrieval pattern among said clusters stored in said retrieval dictionary;

a learned pattern detector that detects a learned pattern at predetermined distance from said retrieval pattern by comparing all the learned patterns that belong to the nearest cluster with said retrieval pattern;

a retrieval range decision unit that decides a retrieval range using said learned pattern detected by said learned pattern detector and said retrieval dictionary; and a retrieval unit that retrieves said retrieval pattern from among all the learned patterns in said retrieval range.

\* \* \* \* \*